(12) United States Patent
Degenhardt et al.

(10) Patent No.: US 11,478,689 B2
(45) Date of Patent: Oct. 25, 2022

(54) ARRANGEMENT, DEVICE AND METHOD FOR GENERATING A STANDING WAVE IN STILL WATER OR SWIMMING FACILITIES

(71) Applicant: UNIT PARKTECH AG, Cologne (DE)

(72) Inventors: Johannes Degenhardt, Cologne (DE); Stefan Jandke, Cologne (DE)

(73) Assignee: UNIT PARTECH AG, Cologne (DE)

( * ) Notice: Subject to any disclaimer, the term of this patent is extended or adjusted under 35 U.S.C. 154(b) by 0 days.

(21) Appl. No.: 16/603,150

(22) PCT Filed: Apr. 4, 2018

(86) PCT No.: PCT/IB2018/000531
§ 371 (c)(1),
(2) Date: Mar. 19, 2021

(87) PCT Pub. No.: WO2018/185565
PCT Pub. Date: Oct. 11, 2018

(65) Prior Publication Data
US 2021/0205685 A1 Jul. 8, 2021

(30) Foreign Application Priority Data
Apr. 5, 2017 (DE) .................... 10 2017 107 338.8

(51) Int. Cl.
*A63B 69/06* (2006.01)
*E04H 4/12* (2006.01)
(Continued)

(52) U.S. Cl.
CPC ........ *A63B 69/0093* (2013.01); *A63G 31/007* (2013.01); *E04H 4/0006* (2013.01)

(58) Field of Classification Search
CPC ....... E04H 3/16; E04H 4/0006; E04H 4/0012; A47K 3/10; A63G 31/007; A63G 31/00; A63B 69/0093; A63B 69/125
(Continued)

(56) References Cited

U.S. PATENT DOCUMENTS 3,473,334 A   10/1969 Dexter
4,662,781 A * 5/1987 Tinkler ................... E02B 1/003
                                                405/79
(Continued)

FOREIGN PATENT DOCUMENTS

CN   202096715 U   1/2012
DE   102011120482 A1 * 6/2013
(Continued)

OTHER PUBLICATIONS

Machine Translation DE 102011120482, pp. 12 (Year: 2013).*
(Continued)

*Primary Examiner* — Sunil Singh
(74) *Attorney, Agent, or Firm* — Carter, DeLuca & Farrell LLP

(57) ABSTRACT

A floating wave generating device for generating a standing wave in a standing water body or water basin includes at least one water acceleration section, at least one wave generation section arranged downstream of the water acceleration section, and at least one pump. The at least one pump is arranged in such a way that with this pump water from the underwater area of the standing water body or water basin can be conveyed to a starting level which is higher than the water level of the standing water body or water basin, in order to generate a water flow directed toward the wave generation section by utilizing gravity. Furthermore, the apparatus is arranged in relation to the standing water body or water basin such that the standing water body or water (Continued)

basin with its water level is part of the wave generation section.

18 Claims, 13 Drawing Sheets

(51) Int. Cl.
*A63B 69/00* (2006.01)
*A63G 31/00* (2006.01)
*E04H 4/00* (2006.01)

(58) Field of Classification Search
USPC ................................................ 405/79; 4/491
See application file for complete search history.

(56) References Cited

U.S. PATENT DOCUMENTS

| | | | |
|---|---|---|---|
| 6,019,547 A | | 2/2000 | Hill |
| 2003/0180095 A1 | | 9/2003 | McFarland |
| 2009/0285633 A1 | * | 11/2009 | Benham ............... A63B 69/125 |
| | | | 405/79 |
| 2011/0099707 A1 | * | 5/2011 | Klimaschewski .... E04H 4/0006 |
| | | | 4/491 |
| 2011/0116870 A1 | | 5/2011 | Aufleger et al. |
| 2014/0000020 A1 | | 1/2014 | von Groll et al. |
| 2016/0199744 A1 | * | 7/2016 | McCarthy .............. A63G 21/18 |
| | | | 472/128 |
| 2017/0036124 A1 | * | 2/2017 | Parlane ................. E04H 4/0006 |

FOREIGN PATENT DOCUMENTS

| | | |
|---|---|---|
| DE | 102011120482 A1 | 6/2013 |
| EP | 0547117 A1 | 6/1993 |
| WO | 2004076779 A1 | 9/2004 |
| WO | WO 2009/064445 A1 * | 5/2009 |
| WO | 2018083264 A1 | 5/2018 |

OTHER PUBLICATIONS

German Office Action issued in corresponding German Application No. 10 2017 107 338.8 dated Nov. 24, 2017, 3 pages.
International Search Report and Written Report Documents issued in corresponding International Application No. PCT/IB2018/000531 dated Oct. 17, 2019, 26 pages.

* cited by examiner

US 11,478,689 B2

ARRANGEMENT, DEVICE AND METHOD FOR GENERATING A STANDING WAVE IN STILL WATER OR SWIMMING FACILITIES

TECHNICAL FIELD

The invention relates to an arrangement, an apparatus and a method for generating a standing wave in a standing water body or water basin.

BACKGROUND

From EP 2 066 413 B1, an apparatus for generating straight standing waves in a flowing medium, in particular in flowing waters, is known. This apparatus comprises a transverse structure arranged perpendicular to the flow direction and aligned such that the effluent is transformed from a flowing into a shooting flow motion, a ramp connected to this transverse structure downstream and inclined in the direction of flow, a counter-ramp arranged at the downstream end of this ramp in the direction of flow, a floor arranged downstream of the ramp and counter-ramp, the bottom of which is arranged a height level lower than the downstream end of the ramp and/or the upstream end of the counter-ramp and a height adjustable flow guide body arranged in the downstream end area of the floor at least approximately perpendicular to the flow direction and directing the flow such that no vortices occur which comprise significant flow components counter to the main flow in the flow direction. This apparatus is not only structurally very special and elaborate. Also, in connection with this apparatus, no possibility is described for generating a standing wave in a standing water body or a water basin.

From EP 2 356 298 B1, a ramp inclined as an artificial surfing system for generating a standing wave is known, with water being conveyed to the upper end of the ramp by means of at least one pump over a flow path, and the lower end of the ramp leading into a separate wave pool. In this case, at least one guide device is arranged in the wave pool at a distance from the lower end of the ramp in the direction of flow. During operation of the at least one pump, the wave pool is supposed to have a liquid level that is above the liquid level of a main pool surrounding the wave pool, wherein the water quantity remaining in the wave area in the non-operating state of the at least one pump always opposes a defined resistance to the water flowing down the ramp, so that the formation and the height of the standing wave are influenced by the change in the flow velocity. This surfing system is a stationary two-pool system with a wave pool and a main pool surrounding the wave pool, wherein the water quantity is limited with this two-pool system and is always kept circulating by at least one pump between the different liquid levels of the pools. The operation of this surfing system is therefore very energy and cost intensive. Also, such a surfing system does not allow for generation of a standing wave in a standing water body or a water basin, but only in a separate wave pool.

SUMMARY

Standing water bodies are considered to be, in particular, natural lakes, reservoirs and larger ponds, e.g. swimming ponds, in which no or very little flow prevails or occurs. Furthermore, those seas are regarded as standing water bodies in which currents exist, but—especially near the shore—there are usually no constant, stronger currents in a certain direction as there are in flowing waters.

In particular, swimming pools are regarded as water basins, preferably swimming pools with a certain minimum size, preferably with a length of 15 m or more, of 20 m or more or of 25 m or more and with a width of at least 5 m, preferably at least 10 m and further preferably at least 15 m. For the sake of completeness, it should be pointed out that even significantly larger minimum sizes can be appropriate, for example lengths of at least 35 m, at least 50 m and widths of at least 20 m, or even significantly greater minimum dimensions of lengths and widths. All length and width dimensions explicitly stated above can be combined with one another at will.

The invention is based on the task of providing an arrangement, an apparatus and a method for generating a standing wave in a standing water body or in a—in particular a very large—water basin, by means of which, in a structurally simple manner surfing on a standing wave in the standing water body or water basin is allowed, especially on a standing wave generated by a change-over.

An arrangement according to the invention relates to an apparatus for generating a standing wave in a standing water body or water basin. The apparatus has at least one water acceleration section, at least one wave generation section arranged downstream of the water acceleration section, and at least one pump. At least one pump is arranged in such a way that this pump can convey water from an underwater area of the standing water body or water basin to a starting level which is higher than the water level of the standing water body or water basin so that gravity can be used to generate a water flow in the direction of the wave generation section. The apparatus is arranged in relation to the standing water body or water basin such that the standing water body or water basin is part of the wave generation section with its water level.

The water acceleration section within the meaning of the invention is any construction which is suitable for generating a water flow directed toward the wave generation section by utilizing gravity. This can be done, in particular, by placing a water collecting basin as part of the water acceleration section or upstream of the water acceleration section. In an arrangement of the water collecting basin as part of the water acceleration section, acceleration can be brought about in particular by the fact that water in the water collecting basin is conveyed to a starting level higher than the water level of the standing water body or water basin so that the resulting water pressure accelerates water out of the water collecting basin through at least one opening in the direction of the wave generation section. This can be achieved, in particular, by a floor-based gap which, in the manner of a weir, provides a fluid connection between the water collecting basin and the standing water body or water basin for flow-off.

When the water collecting basin is arranged upstream of the water acceleration section, acceleration can also take place, in particular, via a downward slopingly inclined flow-off ramp in the manner of a water slide.

In both cases, at least one pump must be designed to convey a sufficiently large quantity of water to generate a sufficiently large water flow which, in conjunction with the wave generation section and in direct interaction with the water of the standing water body or water basin, can generate a standing wave. The fact that the standing water body or water basin with its water level is part of the wave generation section is to be understood in this respect in such a way that due to a suitable configuration of the apparatus in the wave generation section, the water flowing off directly engages in interaction with the water of the standing body. In other words, the wave generation section of the apparatus is arranged directly in the standing water body or water basin. Further details relating to this are described below in connection with the dependent claims.

By means of an arrangement according to the invention, it is thus not only possible to generate a standing wave, in particular for surfing, in a standing water body or water basin itself, but this is also possible in a particularly energy-efficient manner due to generation of the wave in the standing water body or water basin itself, in particular because the water to be conveyed with the aid of the at least one pump need only be conveyed over a relatively small height in order to be able to generate a standing wave.

For the sake of completeness, attention is drawn at this point to the fact that it can be advantageous to have the water acceleration section and the wave generation section bordered on at least two sides by means of lateral limiting elements from the standing water body or water basin.

In a practical embodiment of an arrangement according to the invention, the wave generation section is arranged at least partially below the water level of the standing water body or water basin. Preferably, the wave generation section is arranged completely below the water level of the standing water body, in particular as a ramp surface area which is inclined upwards in the direction of flow, over which the directed water flow must flow. By means of such an arrangement, the energy required for the generation of the standing wave can be further reduced to the extent that after an initial displacement of water from a region in front of a ramp surface area, the directed water flow is accelerated also in a region below the water level.

In connection with the last-described embodiment, in particular an optional floor element, which is arranged between lateral limiting elements, is advantageous, which represents a lower limit for the water flow conveyed through the acceleration section, in relation to the standing water body or water basin. Such a floor element is preferably arranged completely below the water level of the standing water body or water basin.

A section directly adjoining a ramp surface area and having lateral limiting elements and a floor element extending between the lateral limiting elements can be regarded as a kind of channel leading to an outflow area (open to the standing water body or water basin). The length of such a channel is preferably 1 m to 10 m, further preferably between 1.5 m and 8 m, and particularly preferably between 2 m and 6 m.

Irrespective of the length of such a channel, it is preferred for the lateral limiting elements and the floor element (or several floor elements) to adjoin one another directly, resulting in an upwardly open and downwardly closed, approximately U-shaped channel cross-section.

In a further practical embodiment of an arrangement according to the invention, the apparatus is at least partially designed as a floating body. Preferably, the entire apparatus is designed as a floating body. By a design as a floating body in particular a design is meant by means of which the entire apparatus—at least during the intended operation of this apparatus in an arrangement according to the invention—is buoyant. This applies, in particular, in consideration of any additional loads which may occur during the intended use due to persons and/or due to further construction and/or mounting elements. It is particularly preferred for the apparatus as such to be designed to be buoyant—independently of the operating state.

A buoyant construction of the apparatus can be achieved, in particular, by using suitable materials for the manufacture of the apparatus, in particular materials with a density lower than water and/or by using floating bodies in the form of elements at least partially enclosing cavities in a water-tight manner by means of which elements a sufficiently large buoyancy is generated in the standing water body or water basin.

If the apparatus of an arrangement according to the invention is designed as a floating body, the apparatus can be moved, positioned and fixed in a variable manner within a standing water body or water basin. Thus, within a larger bathing lake or other standing water body, the apparatus can be moved—for example with the aid of a motor boat—to different locations as required and operated there as a temporary attraction. A local fixation, if desired, can be effected in a simple manner by means of ropes, chains or other suitable fastening means on the floor, a side wall or on the banks of a standing water body or water basin.

The design of an apparatus of the arrangement according to the invention as a floating body also has the advantage that the apparatus can move freely relative to the surface of the water, in particular also in the vertical direction. Thus, forces acting on the apparatus in the vertical direction caused by waves can at least partly be absorbed by the apparatus moving upwards or downwards with short-term, medium-term or long-term fluctuations in the water level, thus being able to perform movements relative to the floor of the standing water body or water basin.

For the sake of clarity, it is pointed out that, the phrase that the device is designed completely as a floating body also comprises the feature that the entire apparatus as such is designed to be completely buoyant. In the case of a buoyant construction of the apparatus, additional elements which support the device from the underside can be dispensed with.

If the water acceleration section and the wave generation section are separated at least on two sides by means of lateral limiting elements from the standing water body or water basin, and the apparatus of an arrangement according to the invention comprises as lateral limiting elements two side wall elements extending in a longitudinal direction and arranged at a distance from one another and also at least one floor element extending at least over a part of the length of the side wall elements transversely between these side wall elements, the acceleration section and/or the wave generation section can be protected by means of the lateral limiting elements from lateral interactions and by means of the floor element from influences acting in the vertical direction of the standing water body or water basin, in particular from the temporary influence of water level changes and/or other flow forces. Furthermore, in the acceleration section and in the wave generation section, the resistance which is generated by the water located there, in particular directly behind a ramp surface area, and which is opposed to the directional water flow, can be adjusted. This is advantageous for a precise and reliable generation of a standing wave.

A particularly simple, and thus in terms of manufacture easy to realize, geometric design of the apparatus of an arrangement according to the invention provides for the side wall elements to be connected to one another by means of an additional cross member element to form a U-shaped structure. In this case, the cross member element is arranged, in particular, in an end region of the side wall elements, preferably in the half of the apparatus in which water is conveyed by means of the at least one pump to the starting level higher than the standing water body or water basin.

It is preferred in this connection for the side wall elements and the cross member element to be firmly connected to each another and to form a structure which is open on one side, wherein the directed water flow flows directly into the standing water body or water basin in the direction of the open-sided side of the structure.

For the generation of a standing wave, it is preferable for a ramp surface area inclined upward in the direction of flow of the directed water flow to be formed in the wave generation section downstream of the water acceleration section. In particular, such a ramp surface area is formed in connection with a floor element extending both upstream and downstream of the ramp surface area. This ramp surface area directs the directional flow from the water acceleration section in a diagonally upward direction and thus contributes to generating a surfable standing wave with relatively low energy input. The ramp surface area can be integrally formed on a floor element or made as a separate element and firmly connected to a floor element.

In the same way, as an alternative to a ramp surface area, a step-like downward offset can also be formed in the floor element. With such an offset, it can also be achieved that even with a low volume flow, the directed flow flows away over the standing water that is behind the step or the water moving significantly more slowly, thus forming a surfable standing wave.

The resistance (in the form of the water located behind the ramp surface area) which is opposed to the directional flow behind the ramp surface area can be predetermined by means of a floor element adjoining (especially directly) the ramp surface area downstream. This is because the fast-flowing, directed flow which flows over the ramp surface area hits essentially standing water or water moving at least considerably more slowly water downstream of the ramp surface area. In particular by
- the choice of a suitable length of a floor element behind the ramp surface area,
- the relative position of a floor element behind the ramp surface area against the water level (i.e., the height of the water above the floor element and possibly also an angle between a floor surface and the water surface) and/or
- by means of a geometric change of the floor surface, in particular directly in front of an outflow area, the (water) resistance directly opposing the directional flow can be adjusted. Thus, the removal of a forming change-over and the steepness of a standing wave forming behind the ramp surface area can be adjusted.

For the sake of completeness, it is pointed out that, after reaching a critical angle, the wave breaks in a direction upstream of the upper edge of a ramp surface area and thus "tilts" against the flow direction.

If the resistance is reduced, the standing wave becomes flattened, and the formation of the change-over takes place at a greater distance from the standing wave.

For the sake of completeness, it is to be understood that the invention also extends to arrangements with apparatus in which a ramp surface area is arranged or formed independently or spaced apart from a floor element, i.e. the invention also relates to arrangements wherein a portion of the directed water can flow under a ramp surface area. A floor element is thus not indispensable.

A ramp surface area as described above is preferably arranged immediately upstream of an outflow area open on one side to the standing water body or the water basin.

It is further preferred from an energetic aspect for the ramp surface area of the apparatus in an arrangement according to the invention to be arranged in such a way that the ramp surface area is completely below the water level of the standing water body or water basin during the intended operation of the apparatus, i.e. during the generating of a standing wave.

Irrespective of whether a water collecting basin is part of the water acceleration section or whether it is arranged spatially separated upstream of the water acceleration section, it can be advantageous if a flow-off edge extending over the entire width of the apparatus between the two lateral limiting elements is provided for the flow-off of water from the water collecting basin. Such a flow-off edge preferably extends in the horizontal direction, i.e. perpendicular to the gravity direction. A flow-off edge can be arranged in the upper region of a water collecting basin or also in a region further down. In particular, in the case of an arrangement in the lower region, it may be advantageous to design the outflow opening from the water collecting basin sealable, so that the water in the water collecting basin is brought to a desired minimum level within the shortest time possible by means of the at least one pump, without water draining from the water collecting basin.

Irrespective of the height level of a water collecting basin at which a flow-off edge extending over the entire width of the apparatus is arranged, the flow-off via a horizontal flow-off edge has the advantage that the water flows off uniformly distributed over the width of the apparatus to form the desired directed water flow, in particular when a continuous water flow is conveyed by means of the at least one pump and this water flow flows off out of the water collecting basin via a horizontal edge or through a flow-off slit extending in the horizontal direction.

A simple control of a uniform flow-off can be achieved if a flow-off slit is provided which is limited in its height to a degree which is used completely for the outflow of water and the water is accelerated from the flow-off slit via a slide-like flow-off surface. In this case, the water level in the water collecting basin can always be maintained at a level which is slightly higher than the upper edge of the flow-off slit, by means of the at least one pump, so that the directed flow takes place essentially by acceleration over the flow-off surface. The additional height of the water level in the water collecting basin compared to the flow-off slit in this case has almost no influence on the quantity and the velocity of the water flowing off.

The invention also relates to an apparatus for generating a standing wave in a standing water body or water basin, the apparatus comprising at least one water acceleration section, at least one wave generation section arranged downstream of the water acceleration section, and at least one pump. In this case, the at least one pump is arranged in such a way that, when the apparatus is used as intended, water from an underwater area of the standing water body or water basin can be conveyed to a starting level higher than the water level of the standing water body or water basin in order to utilize gravity (particularly from the starting level, through the flow-off of water) to generate over the water acceleration section a water flow directed in the direction of the wave generation section to an outflow area, wherein the apparatus in the wave generation section further comprises at least one floor element leading to the outflow area.

Preferably, one or more floor elements extend continuously from the water acceleration section to behind the wave generation section so that, when the apparatus is used as intended, water which has been conveyed to the starting level, can return to the standing water body or water basin only as part of the directed water flow via the outflow area. This can be realized either by the fact that water can flow off radially from a centrally arranged starting level in any direction as a directed water flow.

Alternatively, and optionally, the apparatus further comprises lateral limiting elements for laterally limiting the water acceleration section and the wave generation section on two sides in relation to the standing water body or water basin when the apparatus is used as intended. In this case, a directed water flow can be achieved in only one direction or only in selected directions or into a section limited by the lateral limiting elements.

Likewise optionally, the floor element is designed so as to be adjustable in its effective length in the direction of flow.

The apparatus can be buoyant or non-buoyant. Preferably, the apparatus is designed as completely buoyant.

What is meant by the direction of flow is the main flow direction of the directed water flow, which preferably extends in a predominantly horizontal or purely horizontal direction perpendicular to the force of gravity. By means of a floor element designed to be adjustable as to its effective length in the direction of flow, the distance between a developing change-over from a ramp surface area or the standing wave can be varied, which is advantageous for achieving desired properties of the standing wave. As already mentioned, the adjustability of a floor element as to its effective length can also be used to modify the geometric shape and/or height of the generated standing wave and/or the partial pressure of the water, in particular in a subsection which is intended for surfing. A modification of any kind can be effected, in particular, in that the adjusting (water) resistance which acts on the directed flow behind downstream of a ramp surface area is adapted in a manner as described above, in particular by the geometrical design of the floor element (in particular by the effective length and surface design) as well as by the relative arrangement of the floor element with respect to the water level. As the resistance increases, a steeper standing wave usually forms; as the resistance is reduced, a flatter standing wave. Specific practical embodiments for changing the (water) resistance downstream of a ramp surface area are discussed below.

The adjustment of the effective length can be effected in a simple manner, in particular, in that at least one element or region of the floor element is designed to be adjustable in the longitudinal direction and/or in the vertical direction. This also includes a pivotable design of an element connected to the floor element, in particular such that it can be pivoted from a predominantly or exclusively horizontal position into a predominantly or exclusively vertical position such that the effective length of the floor element in the region of the outflow opening is reduced by moving to the vertical position, and/or to counteract an occurring venturi effect. In this respect, reference is made, in particular, to a pivoting of a floor element or a section of a floor element from a horizontal position downwards.

In a further practical embodiment of an apparatus according to the invention for generating a standing wave in a standing water body or water basin, the device also has at least one water acceleration section, at least one wave generation section arranged downstream of the water acceleration section, and at least one pump. Also this apparatus comprises further lateral limiting elements for laterally limiting the water acceleration section and the wave generation section on two sides in relation to the standing water body or water basin when the apparatus is used as intended, wherein the at least one pump is arranged in such a way that when the apparatus is used as intended, water from an underwater area of the standing water body or water basin can be conveyed by this pump to a starting level higher than the water level of the standing water body or water basin in order to utilize gravity (particularly from the starting level, through the flow-off of water over the water acceleration section) to generate a water flow directed in the direction of the wave generation section. The apparatus has at least one leveling device in order to be able to control the immersion depth of the apparatus at least in the wave generation region. Such an apparatus can also be combined with an apparatus as described above.

With regard to a non-buoyant apparatus, it is pointed out that, in particular, one or more stamp-like supports can be provided as leveling devices which can be adjusted in height and are supported on the floor of the standing water body or water basin in an arrangement according to the invention. It is also possible to connect a non-buoyant apparatus by means of cables or other holding devices with suitable structures to the side of the apparatus in order to be able to bring the apparatus to a suitable position in relation to the water level. For this purpose, the apparatus can be braced or connected in particular by means of ropes or holding elements with side walls of a water basin, with bollards in the area of the shore of a standing water body or with other piles or structures in the water basin or standing water body.

In the case of an apparatus which is designed to be buoyant, particularly suitable leveling devices can be one or more trimming tanks, which can be filled with air, water and/or other media as required, in order to allow the apparatus according to the invention to be further immersed in the standing water body or water basin or to raise the level of the apparatus against the water level by changing the fill level of the trimming tanks Trimming tanks can in particular be formed in the region of a floor element, in the region of one or more side elements, in the region of a cross member and/or in the region of a water collecting basin. Furthermore, trimming tanks can be firmly fixed to an apparatus and on any other position of the apparatus.

Both with regard to the trimming tanks and with respect to stamp-like supports, it is pointed out that the arrangement of the supports or trimming tanks cannot only influence the entire immersion level of the apparatus, but also a rotational movement of the entire apparatus relative to the standing water body or the water basin. Such a precision orientation of the apparatus according to the invention can in turn be used to adjust in a suitable manner the water resistance caused by a floor element, and possibly additionally by side wall elements, and first encountered by the directed water flow before it flows out into the standing water body or water basin. In other words, trimming tanks and/or adjustable stamp-like supports can also be used to adjust the resistance directly opposed to the directed water flow downstream of a ramp surface area by predetermining the relative position of the apparatus against the water level. This adjustment possibility can be used—as described above—to modify the geometric shape and/or height of the standing wave that is being formed.

By filling or emptying of one or more trimming tanks or by moving stamp-like supports, a pivoting of the apparatus can also be effected, in particular around horizontal pivoting axes. This can be used, if desired, in particular, in order to establish an exactly horizontal alignment of the top surface of the floor element in the flow direction of the directional flow or another desired orientation of the top surface of the floor element.

In a further practical embodiment of an apparatus according to the invention, one or more wave generation sections are provided, at least two lateral limiting elements being assigned to each wave generation section in order to laterally limit the water acceleration section and the wave generation section on two sides in relation to the standing water body or water basin when the apparatus is used as intended. In this case, several standing waves can be generated with only one apparatus so that the apparatus according to the invention can be used by a larger number of users for surfing on the standing wave without interactions occurring between the users.

The invention also relates to a method for operating an arrangement or apparatus as described above. According to a method according to the invention, the at least one pump conveys so much water that a water film thickness of at least 15 cm is formed in the water acceleration section. The arrangement is preferably controlled in such a way that a water film thickness of at least 20 cm, more preferably at least 25 cm and particularly preferably at least 30 cm, is formed. Said water film thickness refers to the dimension measured perpendicular to the flow direction and perpendicular to the width, which in the horizontal flow direction extends parallel to gravity, for example when the directed flow flows over a horizontally oriented top side surface area of a floor element.

The above mentioned minimum water film thicknesses have the benefit that a standing wave can be formed by means of a change-over, namely in that a rapidly flowing water volume hits a slowly flowing or standing water volume and because of the water volumes hitting each other at different speeds a standing wave forms. This has the benefit, in particular in connection with surfing, that a falling surfer does not fall largely unbraked on a (as compared to water, hard) mat as is installed by so-called "Sheet-Flow" apparatus. Such "Sheet-Flow" apparatus do not generate a standing wave by means of a change-over, but only by the fact that a rather thin water film with a thickness of a few centimeters is conveyed via a ramp-like structure. An advantage of the apparatus according to the invention and the arrangement according to the invention is thus that the water level in the useful area in which using the generated standing wave surfing is possible is sufficiently high to be able to use surfboards with fins.

In particular, in a useful area which extends from the wave crest of the standing wave to at least one wave trough which forms upstream of the wave crest, water heights of at least 20 cm, preferably at least 30 cm, at least 35 cm or at least 40 cm (measured in said wave trough) to at least 90 cm, preferably at least 100 cm (measured in said wave crest) can be achieved. In a practical embodiment, in the range of the wave crest, water heights of approximately 100 cm to 300 cm, in particular 100 cm to 200 cm, are provided. A method and an arrangement with which such water heights are set or realized in a useful area behind a ramp surface area is hereby explicitly referred to.

In a further practical embodiment of a method according to the invention for operating an arrangement or apparatus as described above, with the aid of the at least one pump, so much water is conveyed that a water speed of at least 4.5 m/s is established in the water acceleration section. With such or higher water velocities, standing waves can be generated reliably and permanently by means of a change-over with apparatus and arrangements according to the invention. Preferably, with the aid of at least one pump, so much water is conveyed that a water velocity in the water acceleration section of at least 5 m/s is established, in particular in connection with a minimum water film thickness of 15 cm, 20 cm or 30 cm as described above.

Further preferably, the above mentioned values are obtained individually or in combination with a width of the directed water flow of at least 4 m, preferably at least 6 m or 8 m, and further preferably at least 10 m or 12 m. In this case, several surfers may surf next to each other on the standing wave generated by the directed water flow.

In a further practical embodiment of a method according to the invention for operating an arrangement or apparatus as described above, a standing wave is formed by a fast-flowing directed water flow impacting on a water mass of the standing water body or water basin in the wave generation section. In other words, according to this method—as already explained in connection with the apparatus and the arrangement—the standing water body or water basin is part of the wave generation section, in which a standing wave is formed as a change-over. Reference is made once again to the benefits and details described above in connection with the other patent claims.

BRIEF DESCRIPTION OF THE DRAWINGS

Further practical embodiments and advantages of the invention are described below in connection with the drawings, which show the following.

DETAILED DESCRIPTION

Figure 1:
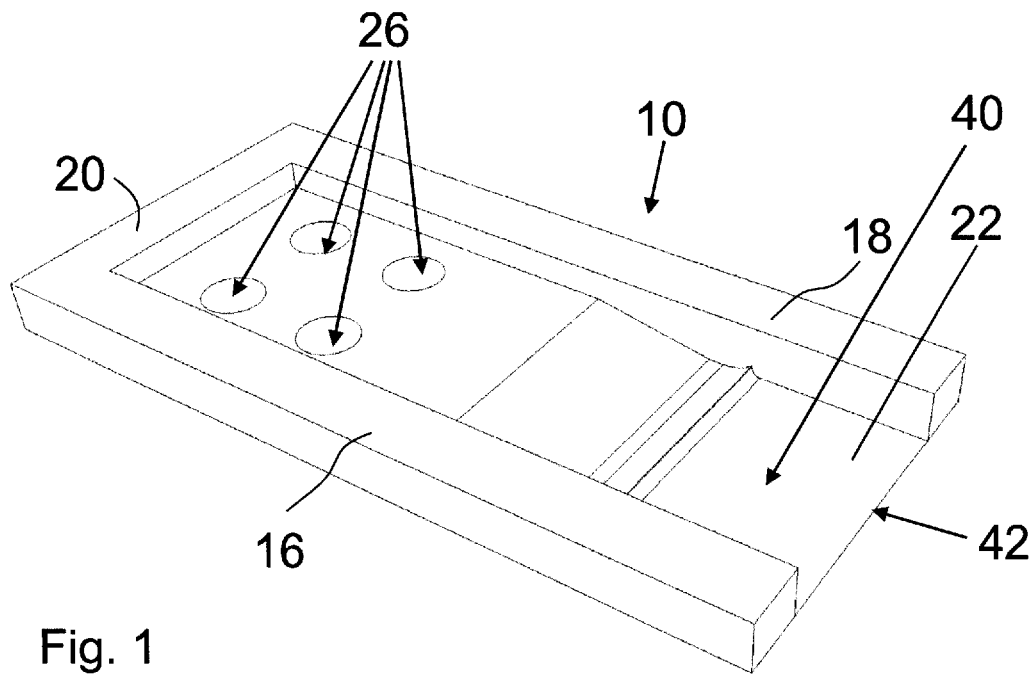
FIG. 1 a perspective view of an apparatus for an arrangement according to the invention in a view from obliquely above, FIG. 2 the apparatus from FIG. 1 in a view from above, FIG. 3 a perspective longitudinal sectional view of the apparatus from FIGS. 1 and 2 according to the sectional line from FIG. 2, FIG. 4 a further apparatus for an arrangement according to the invention in a perspective view in a view from obliquely above, FIG. 5 the apparatus from FIG. 4 in a longitudinal section cut through the center, FIG. 6 the apparatus from FIGS. 4 and 5 in a perspective longitudinal sectional view, FIG. 7 a further apparatus in an arrangement according to the invention in a longitudinal sectional view, FIG. 8 a further apparatus in an arrangement according to the invention in a longitudinal sectional view, FIG. 9 a further apparatus in an arrangement according to the invention in a longitudinal sectional view, FIG. 10 a further apparatus in an arrangement according to the invention in a longitudinal sectional view, FIG. 11 a further apparatus in an arrangement according to the invention in a longitudinal sectional view, FIG. 12 an apparatus according to the invention in an arrangement according to the invention in a longitudinal sectional view, FIG. 13 a further apparatus according to the invention in an arrangement according to the invention in a longitudinal sectional view, FIG. 14 a further apparatus according to the invention in an arrangement according to the invention in a longitudinal sectional view, FIG. 15 a further apparatus in an arrangement according to the invention in a perspective view viewed from obliquely above, and FIG. 16 the apparatus from FIG. 15 in a sectional view along line XVI-XVI in FIG. 15.
Figure 2:
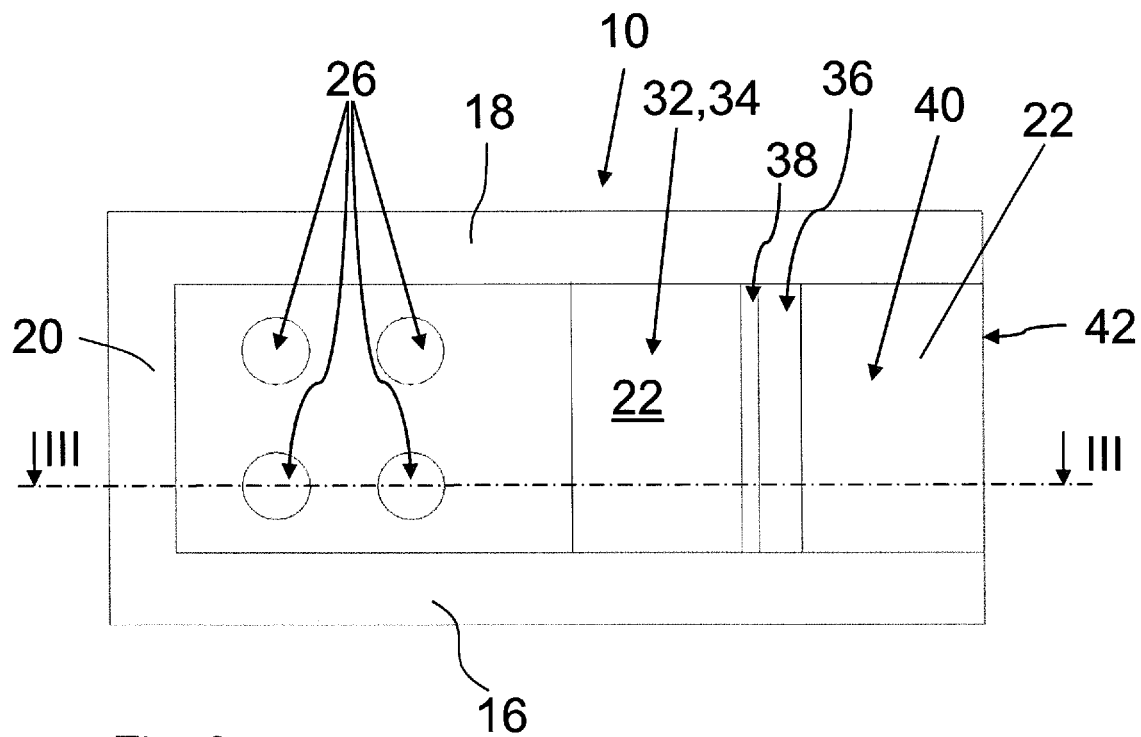
Figure 3:
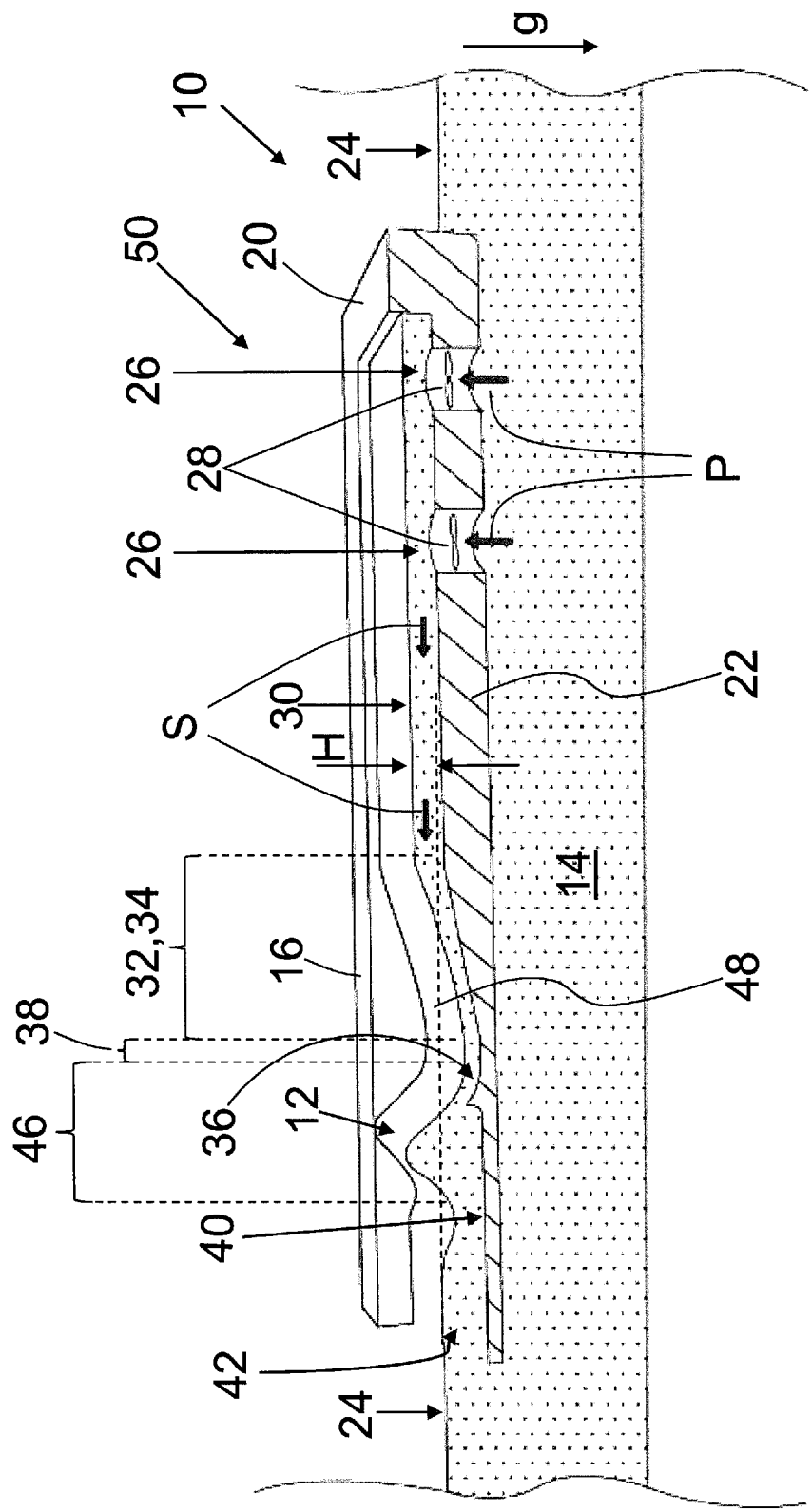

In FIGS. 1 to 3, an apparatus 10 is shown for generating a standing wave 12 in a water basin 14 (only shown merely partially in FIG. 3). The apparatus 10 is essentially formed by a first side wall element 16, a second side wall element 18 and a cross member 20. In the exemplary embodiment shown in FIGS. 1 to 3, the side wall elements 16, 18, and the cross member 20 each have the same height and are fixedly connected to each other in a U-shaped structure.

Between the side wall elements 16, 18, a floor element 22 extends from the cross member 20. In the embodiment shown, the floor element 22 extends over the full width between the first side wall element 16 and the second side wall element 18.

FIG. 3 also shows the water level 24 of the water basin 14 relative to the apparatus 10. The water basin 14, which is only partially shown, is a water basin the water level 24 of which does not change or changes only insignificantly because of the immersion of the apparatus 10, because the volume of the water basin is many times greater than the volume of water displaced by the apparatus 10. The water level 24 is therefore approximately constant, similar to the water level of a large lake or other standing water body.

As can be seen in FIGS. 1 and 2, four passage openings 26 are formed in the floor element 22. As can be seen in FIG. 3, a pump 28 is arranged in each passage opening 26 such that with these pumps 28, water from the underwater region of the water basin 14 can be conveyed to a starting level 30 higher than the water level 24 of the water basin 14, as indicated by the arrows P in FIG. 3.

The water flows due to gravity from this starting level 30 via a water acceleration section 32 to a ramp surface area 36 which is inclined upwards in the flow direction according to the arrows S in FIG. 3. The water acceleration section 32 is designed in the form of a slide-like flow-off surface 34 in the exemplary embodiment shown. The flow-off surface 34 and the ramp surface area 36 are formed here as part of the top side surface area 40 of the floor element 22.

Between the flow-off surface 34 and the ramp surface area 36, a plane and horizontally oriented intermediate area 38 is formed on the floor element 22 in the embodiment shown.

Downstream of the ramp surface area 36, the top side surface area 40 of the floor element 22 is planar.

As can be seen from FIGS. 1 and 2, the floor element 22 in the embodiment shown in FIGS. 1 to 3 is as long as the first side wall element 16 and the second side wall element 18, so that the open end of the U-shaped structure, together with the end of the floor element 22, form an outflow area 42 open on one side, in which the height of the water level corresponds to the water level 24 of the water basin 14.

As can be seen in FIG. 3, the ramp surface area 36 and the top side surface area 40 of the floor element 22 adjoining the ramp surface area 36 downstream form a wave generation section 46, in which a standing wave 12 is formed in interaction with the water of the water basin 14. This can be seen by the fact that the water level 24 forms immediately after the standing wave.

In the embodiment of the apparatus 10 shown in FIGS. 1 to 3, both the ramp surface area 36 and the top side surface area 40 of the adjoining floor element 22 are located completely below the water level 24. The water flowing off from the starting level 30 flows down the flow-off surface 34 in a directed flow and has sufficiently high energy, so that the water of the water basin 14, which is at the level indicated by dashed line 48 when the pumps 28 are at a standstill, completely remains in the area behind the standing wave 12. As a result, the generating of the standing wave 12 can occur in an energy-efficient manner in that the starting level 30 must only be raised by the amount H with respect to the water level 24.

In the embodiment shown in FIGS. 1 to 3, the water is conveyed upwards in the vertical direction counter to gravity g with the pumps 28.

With the arrangement 50 according to the invention shown in FIG. 3, a standing wave 12 can be generated in a hitherto unknown manner by placing the apparatus 10 in a water basin 14, in that water is conveyed to a starting level 30 by means of pumps 28, in order to cause a directed water flow in the direction of the arrows S, wherein the water flow is directly returned into the water basin 14 and a standing wave 12 is formed in the wave generation section 46 by direct interaction of the directed water flow with the water level 24 of the water basin 14.

Further apparatus 10 and further arrangements 50 are now described in connection with FIGS. 4 to 14. For the description of these apparatus 10 and arrangements 50, the same reference symbols as in FIGS. 1 to 3 are used for identical or at least functionally equivalent components. Unless otherwise described, the above described properties also apply to the elements which are denoted by the same reference symbols below.

Figure 4:
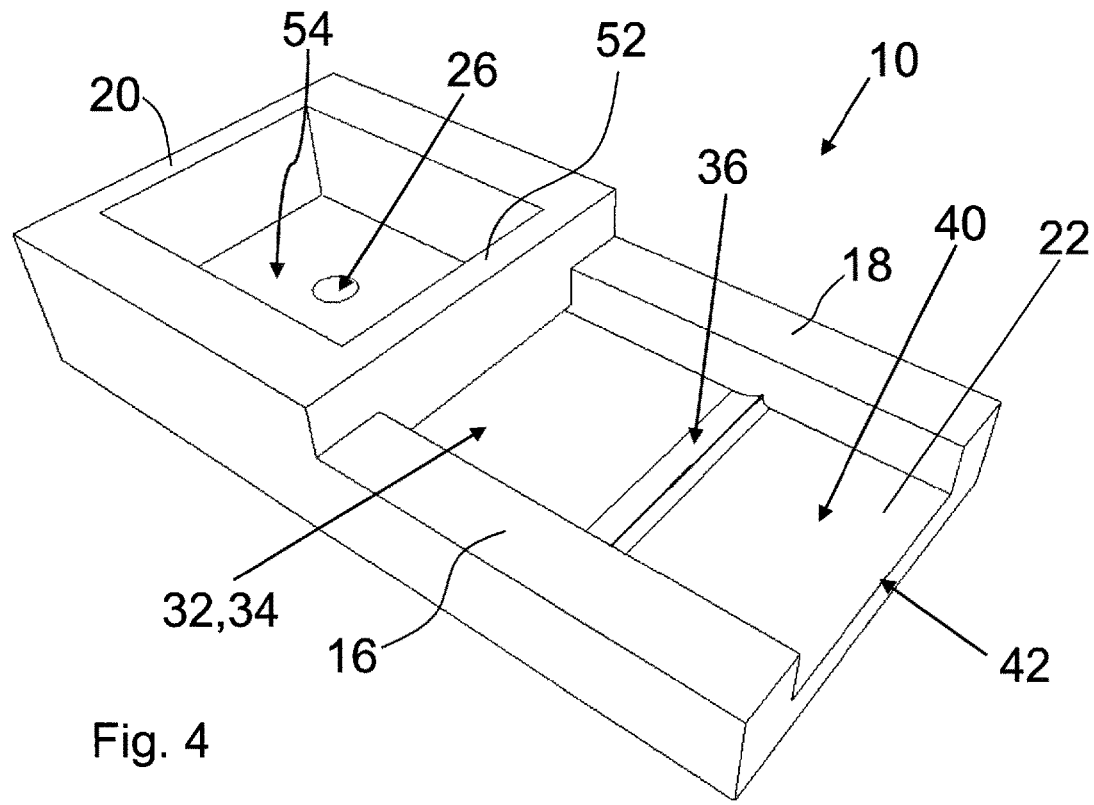
Figure 5:
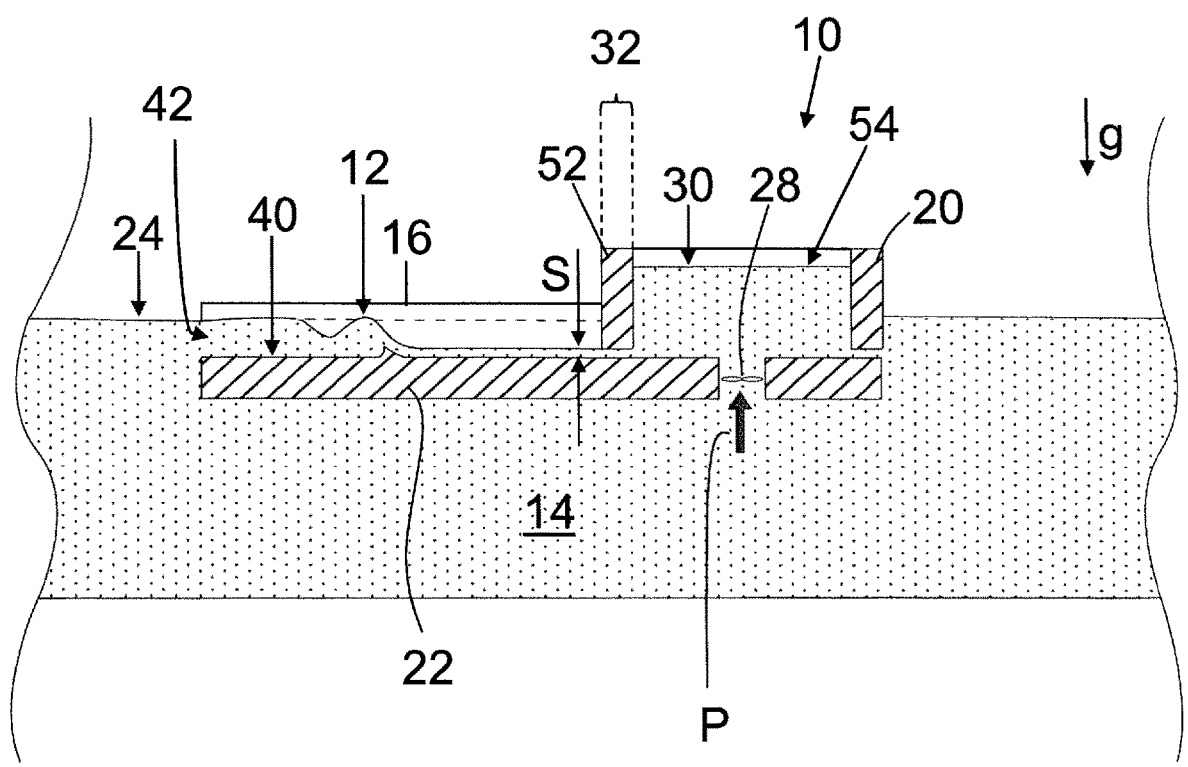
Figure 6:
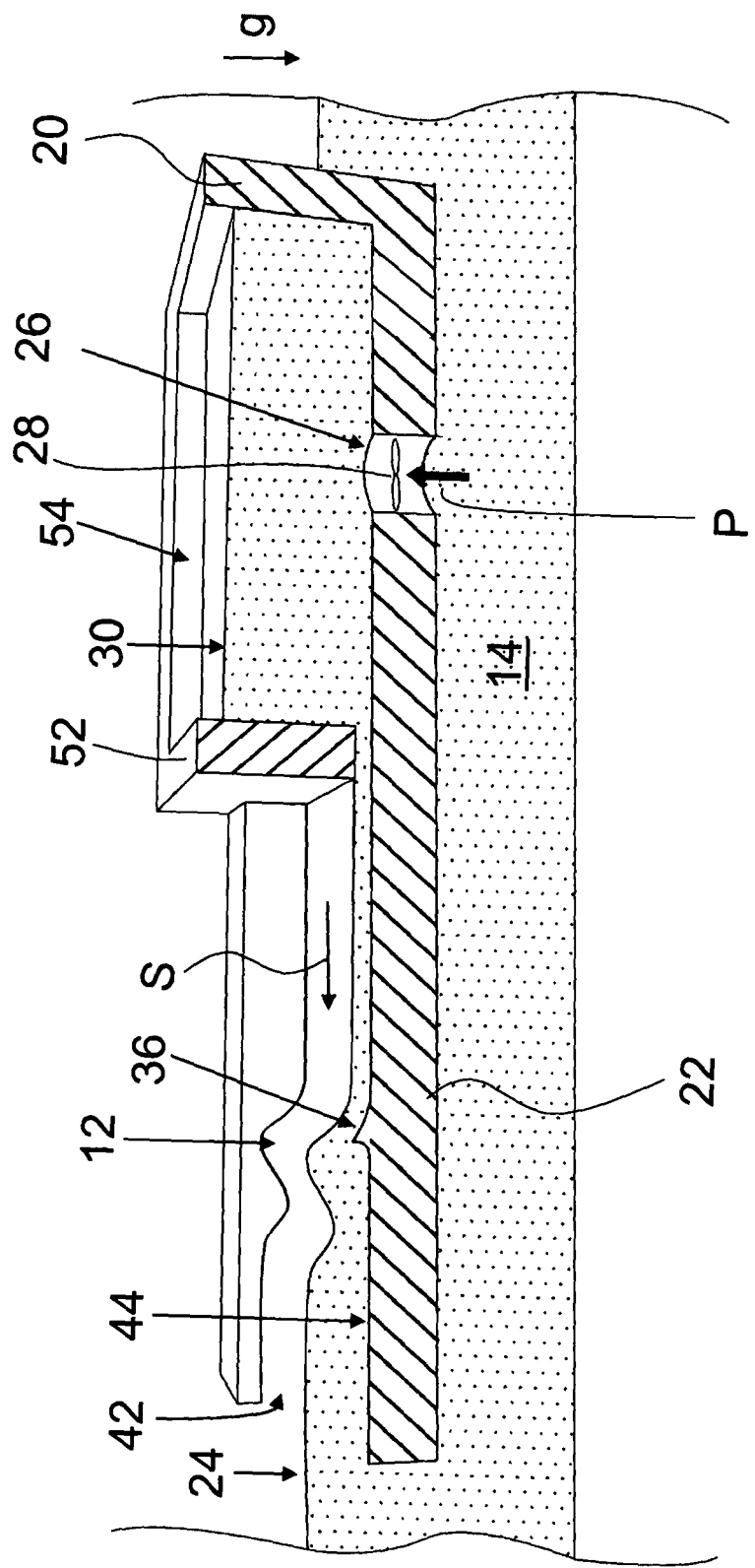

With the apparatus shown in FIGS. 4 to 6, the first side wall element 16 and the second side wall element 18 are raised on the side opposite the outflow area 42. Furthermore, a cross wall 52 is arranged at a distance from the cross member 20 in such a way that a water collecting basin 54 is formed in a region surrounding the passage opening 26 with a pump 28 inserted therein. As can particularly be seen in FIGS. 5 and 6, water is conveyed from the water basin 14 into the water collecting basin 54 by means of the pump 28 in the direction of the arrow P, so that a starting level 30 is established in the water collecting basin 54 which is higher than the water level 24.

It can also be readily seen in FIGS. 5 and 6 that a gap with the height S is formed between the cross wall 52, the water collecting basin 54 and the floor element 22, which gap extends over the entire width between the first side wall element 16 and the second side wall element 18. Due to the effect of gravity g on the water accumulated in the water collecting basin 54 and the resulting water pressure, the water is accelerated through the gap with the height S in the direction of the outflow section 42 so that a flow in the direction of the arrow S is established. In this embodiment, the cross wall 52 acts in this regard like a known weir in flowing waters. In this embodiment, an acceleration area beginning below the cross wall 52 can be regarded as the water acceleration section 32, the length of the acceleration area in the flow direction being dependent on the height of the water level in the water collecting basin 54. It extends as far as an acceleration effect acts on water flowing out of the water collecting basin 54.

The alternative apparatus 10 explained in the following with reference to FIGS. 7 to 14 are essentially based on the operating principles as described above.

Figure 7:
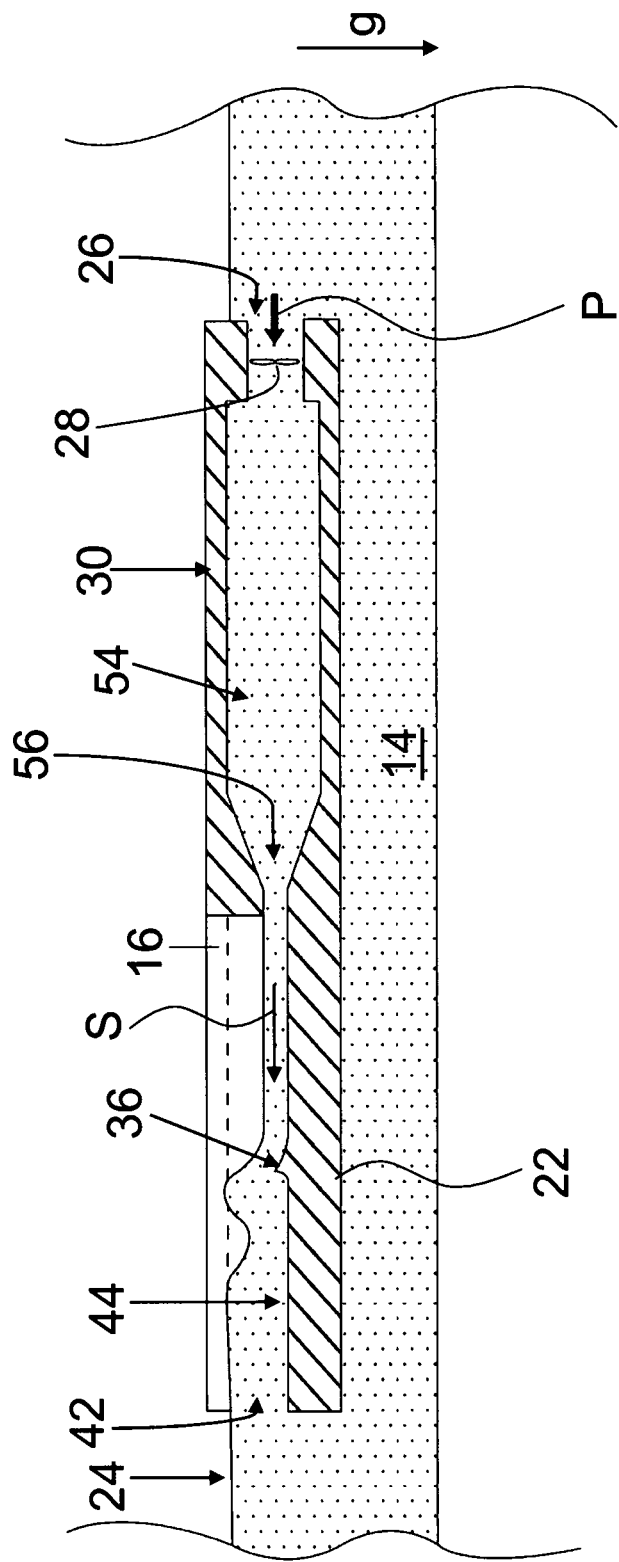

In the apparatus shown in FIG. 7, the pump 28 conveys water in the horizontal direction as shown with arrow P. In this embodiment, a water collecting basin 54 is formed which extends on the upper side over the entire width between the side wall elements 16, 18. In this respect, the water collecting basin 54 has only one outflow opening 56 in addition to the passage opening 26, via which water (while the pump 28 is running) is conveyed into the basin exclusively by means of the pump 28. A directional water flow in the direction of the arrow S is generated via this outflow opening 56.

In the embodiment shown in FIG. 7, by increasing the power of the pump 28, in particular after the water collecting basin 54 is completely filled with water as shown in FIG. 7, the flow rate of the water exiting the outflow opening 56 can be further increased by means of the pump 28.

Furthermore, in this embodiment, the pump power can be adjusted in an energy-efficient manner by a float located in the water collecting basin 54 detecting the height of the water level 24 in the water collecting basin 54, and the performance not being increased any further once the float has reached the highest position in the water collecting basin 54.

Figure 8:
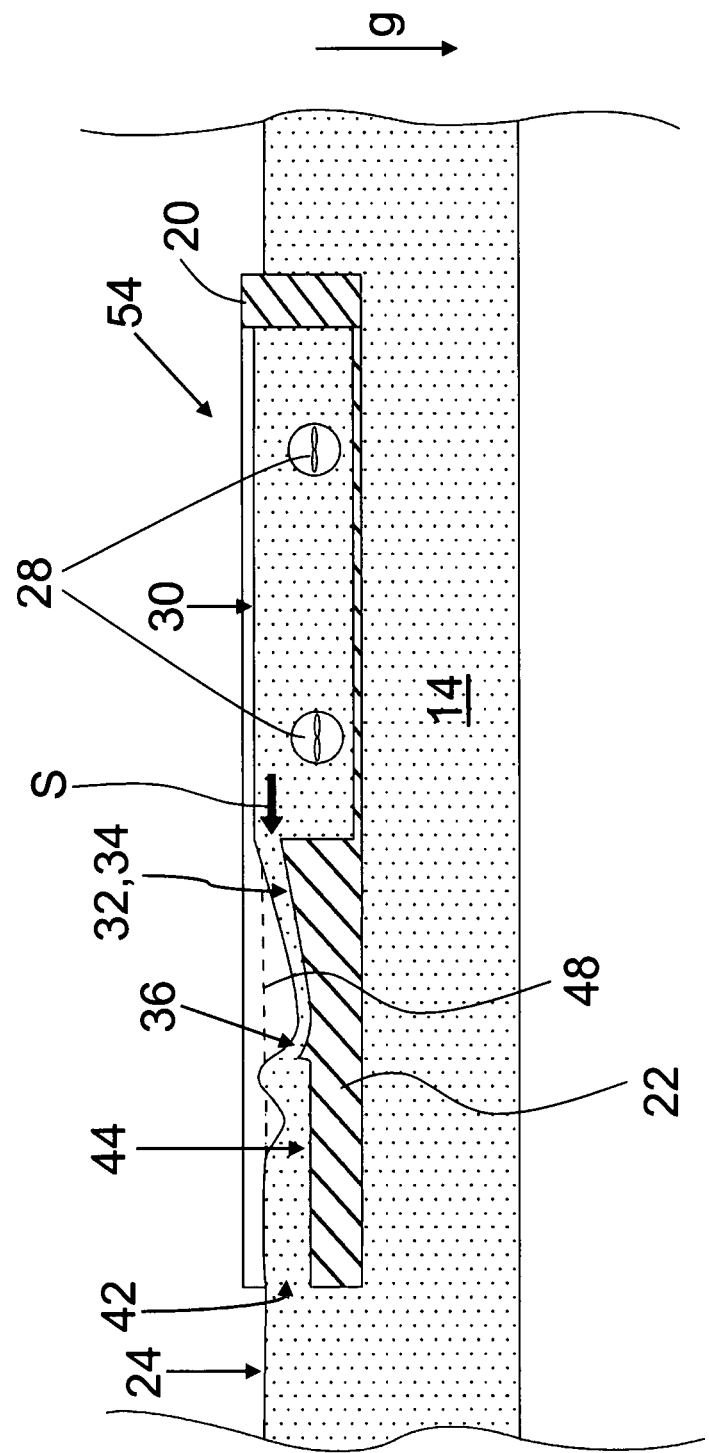

In the embodiment shown in FIG. 8, two pumps 28 are shown by way of example to illustrate the functional principle. These are arranged on the side wall element 18, which is not visible in FIG. 8 because of the cross-sectional plane. This side wall element 18 is not shown in FIG. 8.

Using the pumps 28, water is conveyed from the water basin 14 in the horizontal direction transverse to the main flow direction S into the water collecting basin 54. In a similar manner as in the apparatus 10 described in connection with FIGS. 1 to 3, water flows in the embodiment of the apparatus 10 shown in FIG. 8 via an flow-off surface 34 (accelerated by gravity g) in the direction of the ramp surface area 36.

Figure 9:
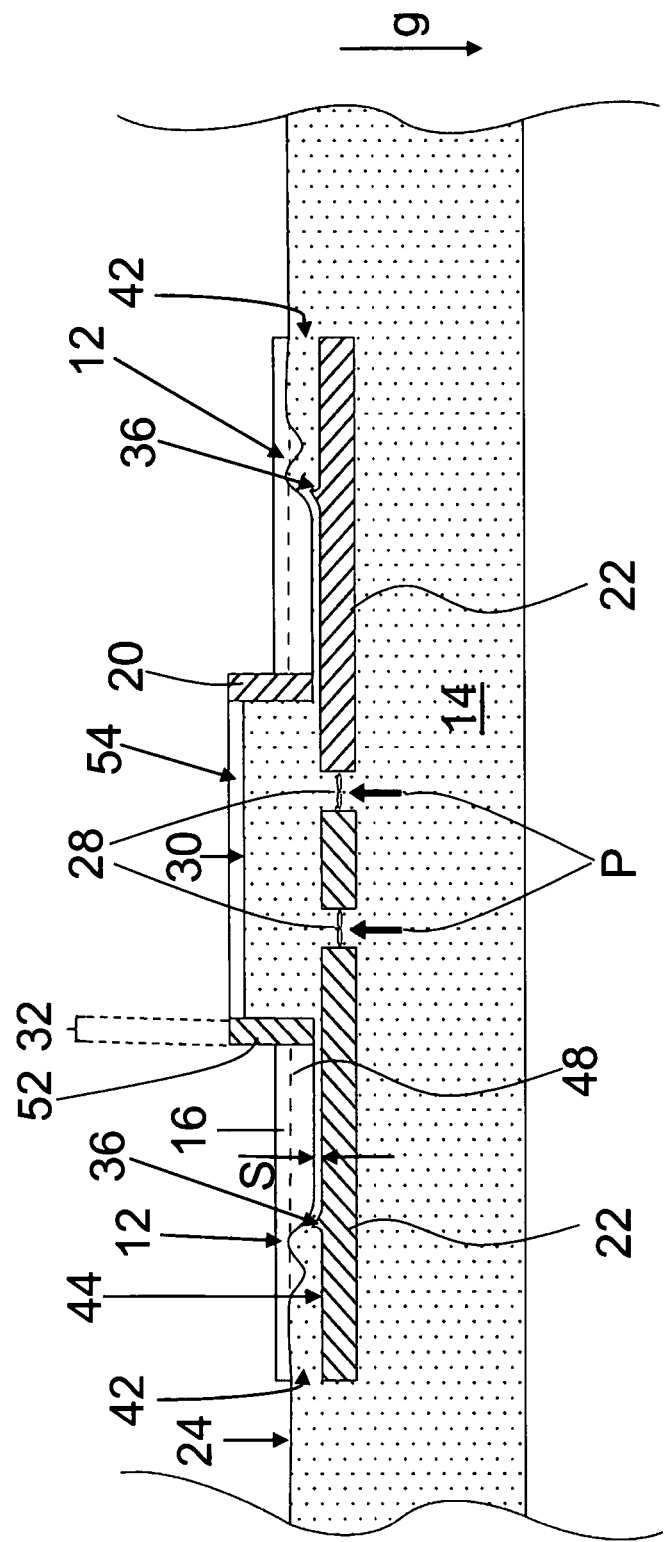
Figure 10:
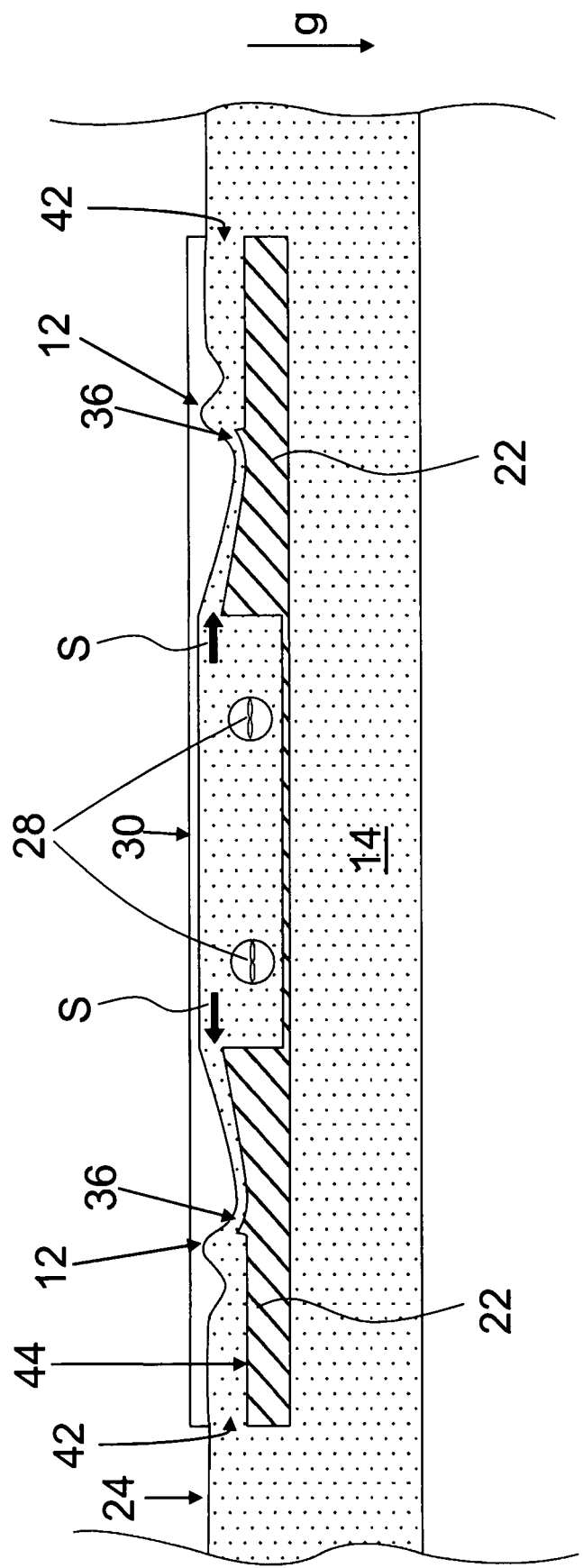
Figure 11:
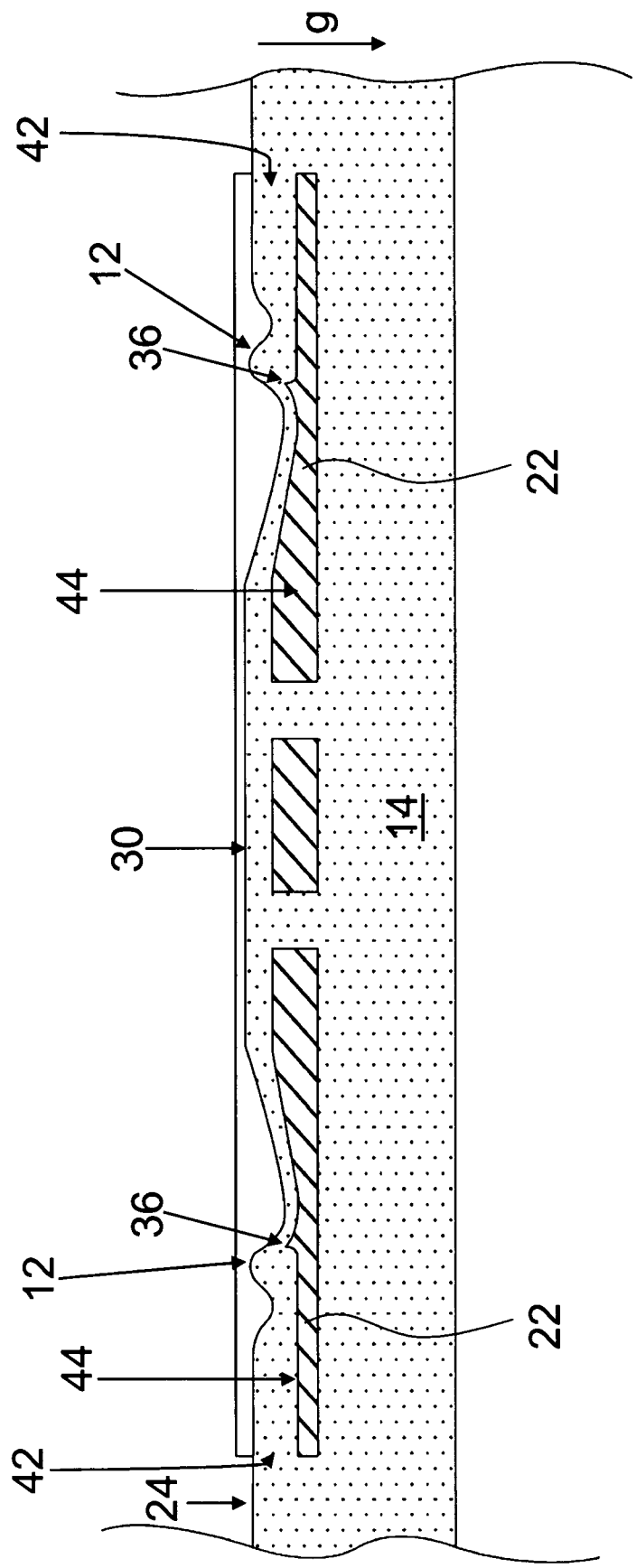

FIGS. 9 to 11 show various further apparatus 10 in arrangements 50 according to the invention, by means of which several standing waves 12 can be generated and used independently of each other. This is achieved by a plurality of outflow openings 56 or several flow-off surfaces 34 being formed. The operation is analogous to the corresponding apparatus 10 described above in connection with generating a standing wave 12. In detail, this means that the apparatus 10 shown in FIG. 9 functions analogously to the apparatus 10 described in connection with FIGS. 4 to 6, the apparatus 10 shown in FIG. 10 analogously to the apparatus 10 described in connection with FIG. 8, and the apparatus shown in FIG. 11 analogously to the apparatus 10 described in connection with FIGS. 1 to 3. In FIG. 11, the illustration of a pump has been omitted. Nevertheless, at least one pump (not shown) is also arranged in the passage openings 26.

Figure 12:
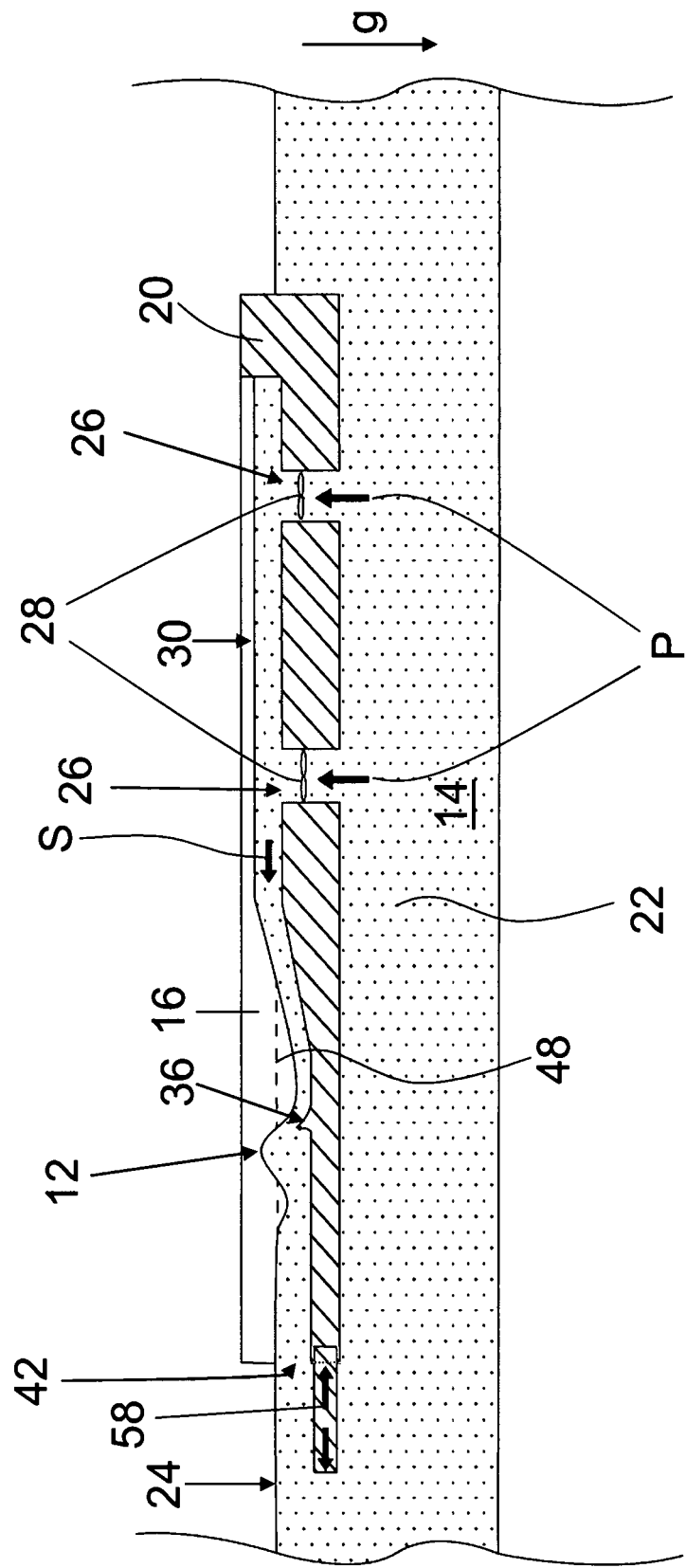
Figure 13:
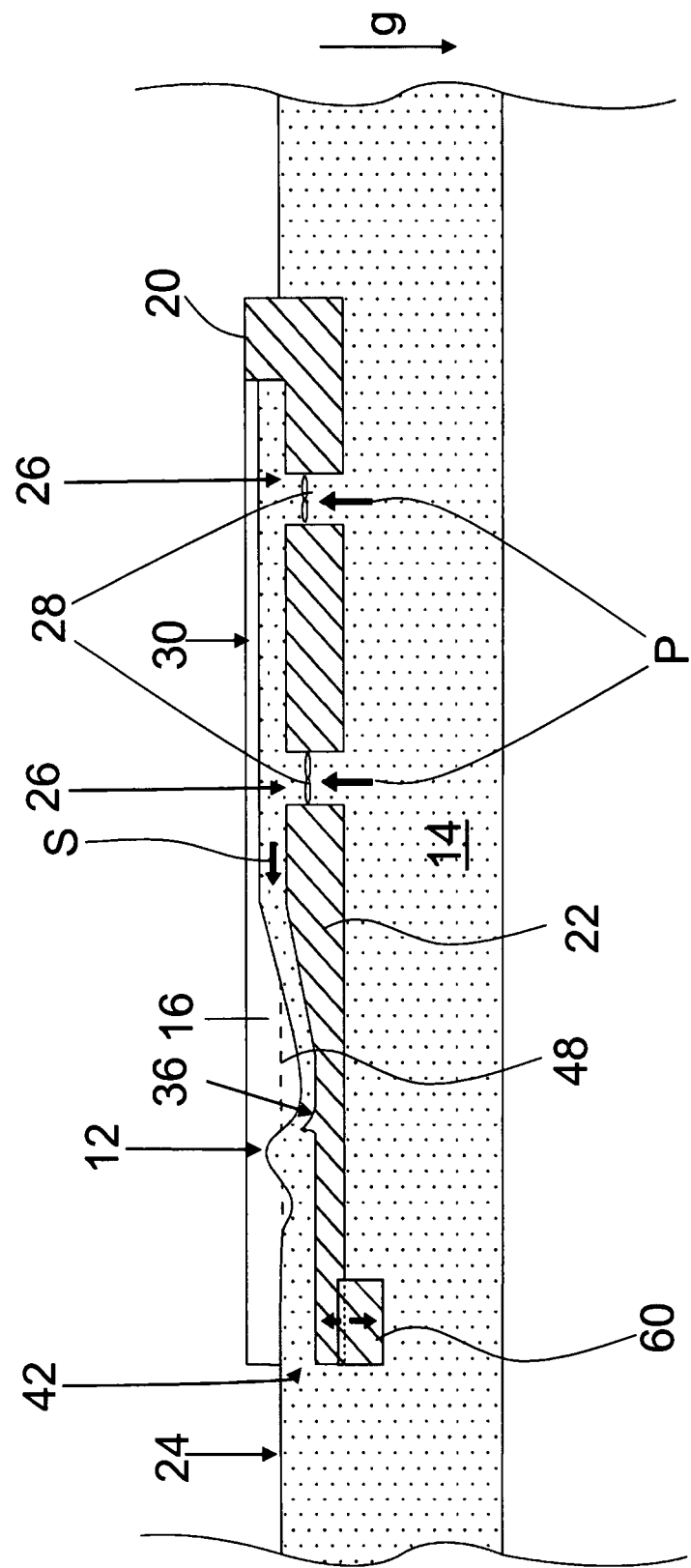

FIGS. 12 and 13 show apparatus 10 according to the invention which have floor elements 22 with adjustable partial elements 58, 60.

The partial element 58 shown in FIG. 12 is designed to be adjustable in the horizontal direction, as indicated by the two arrows in the partial element 58, in order to be able to adjust the effective length of the floor element 22.

The partial element 60 shown in FIG. 13 is designed to be adjustable in the vertical direction, as indicated by the two arrows in the partial element 60, in order to be able to adjust the effective height of the floor element 22 in the outflow area 42. The adjustment can take place in such a way that, starting from a base thickness of the floor element 22, the partial element 60 can be moved downwards in order to increase the effective height of the floor element 22 and thus to be able to counteract any eventual venturi effect. Such a venturi effect occurs, in particular, or is greater, the faster water flows out of the outflow area into the standing water body or water basin 14, and the lower the aforementioned base thickness of the floor element 22. The occurrence and the intensity of the venturi effect is thus also dependent on the length of the floor element, measured from the end of a ramp surface area 36. The greater the length of the floor element, the lower the velocity of the outflowing water and thus also the probability that a venturi effect must be counteracted.

Figure 14:
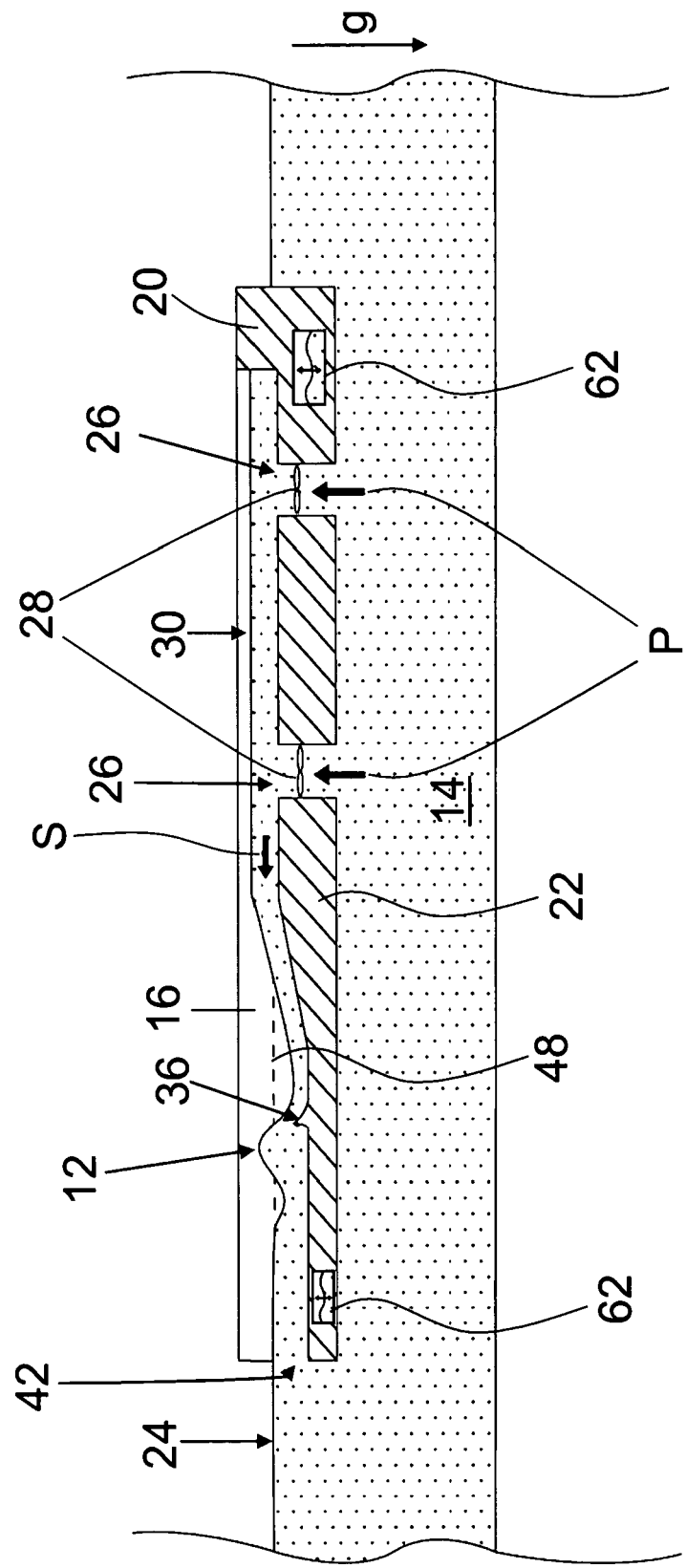

FIG. 14 shows an apparatus 10 according to the invention with trimming tanks 62. The trimming tanks 62 are designed as hollow chambers, which are shown here only schematically and can be filled and emptied as required with a suitable medium in order to adjust the depth of flotation or the position of the apparatus in relation to the water level 24.

Figure 15:
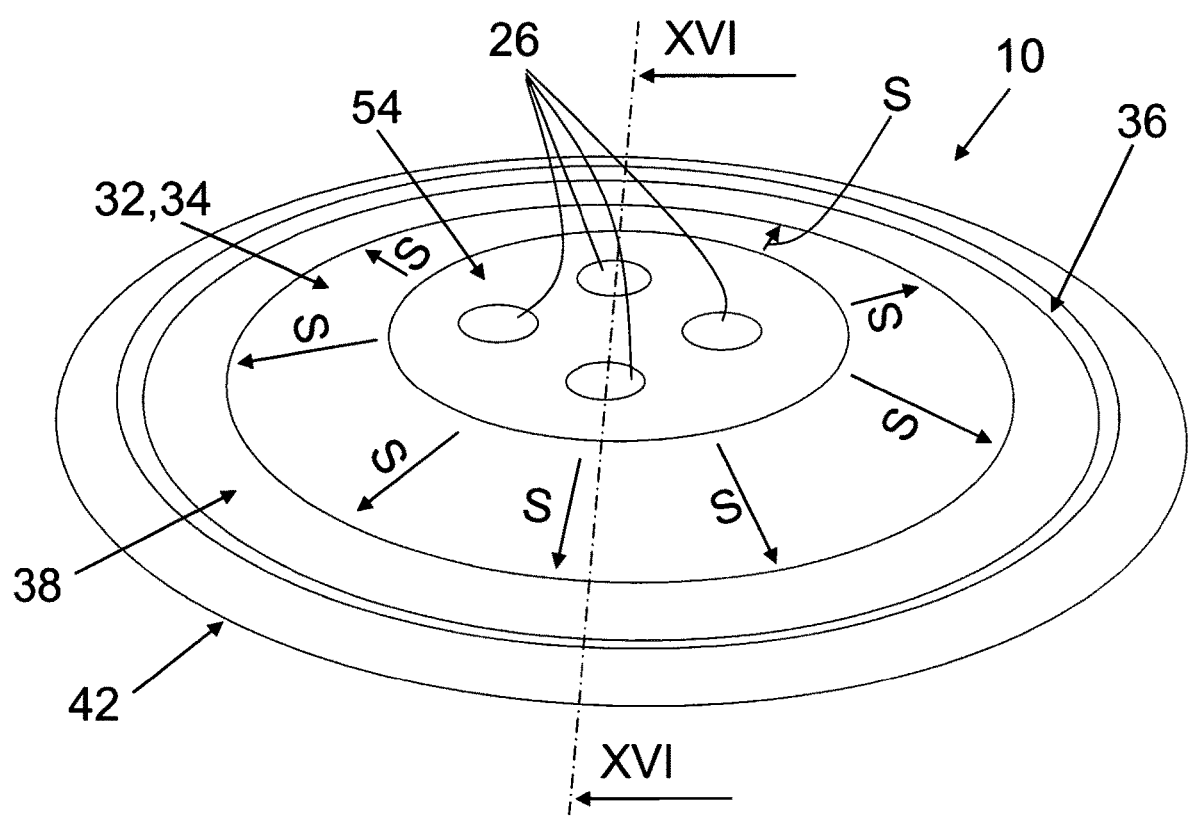
Figure 1:
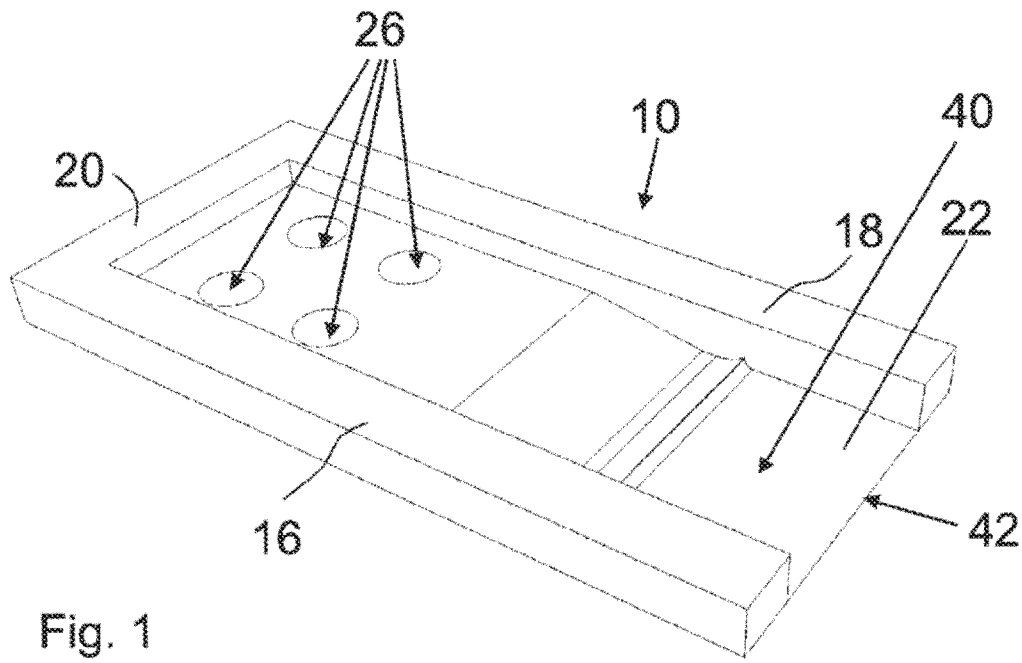
Figure 2:
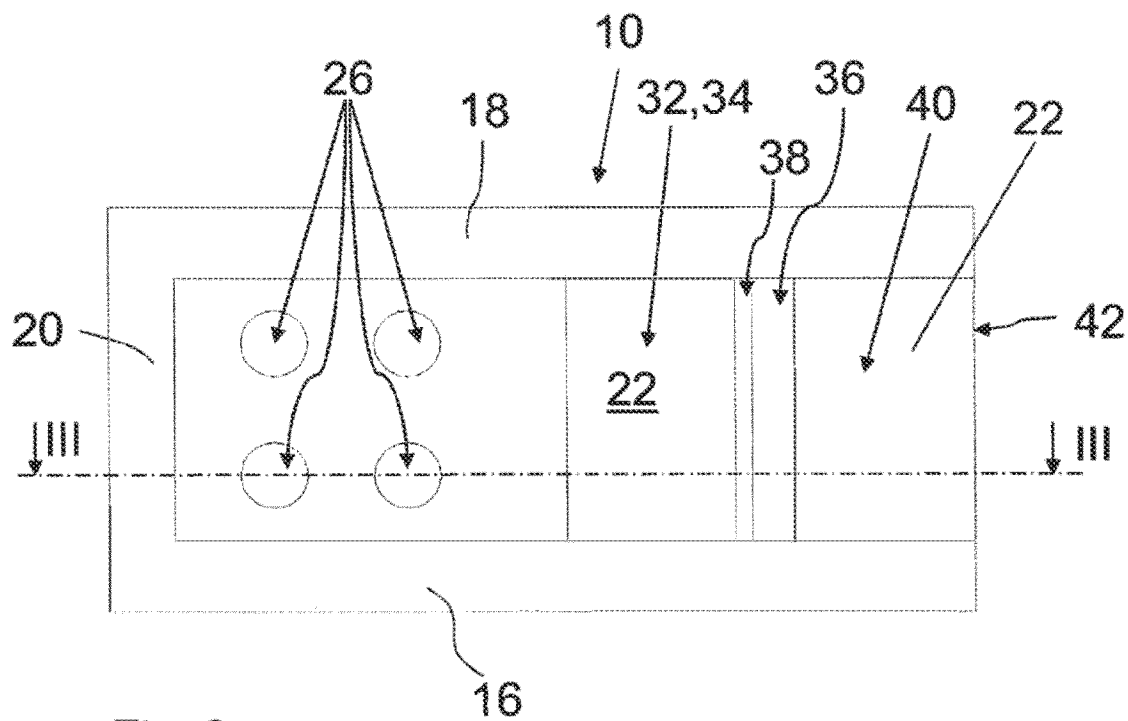
Figure 3:
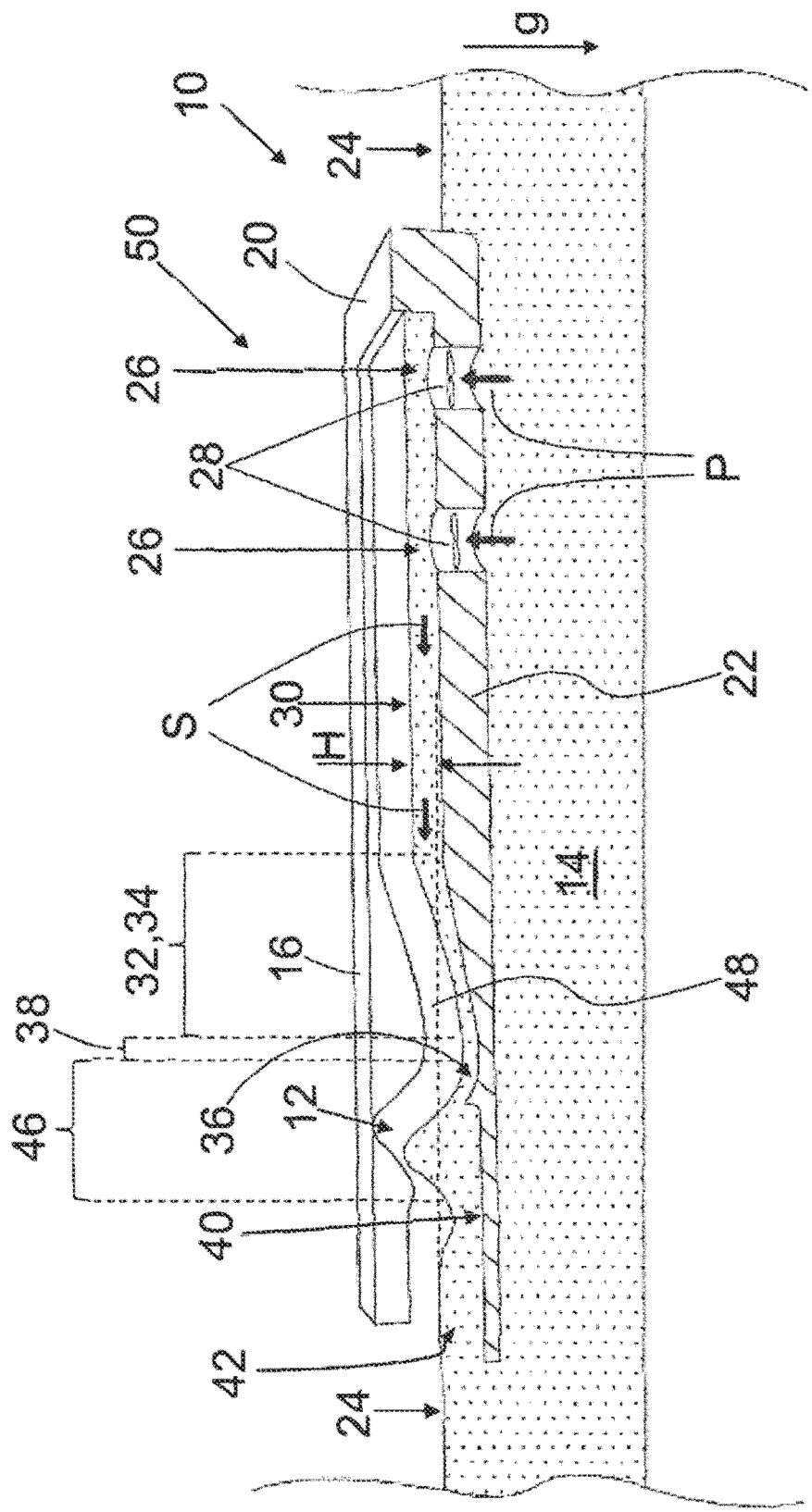
Figure 4:
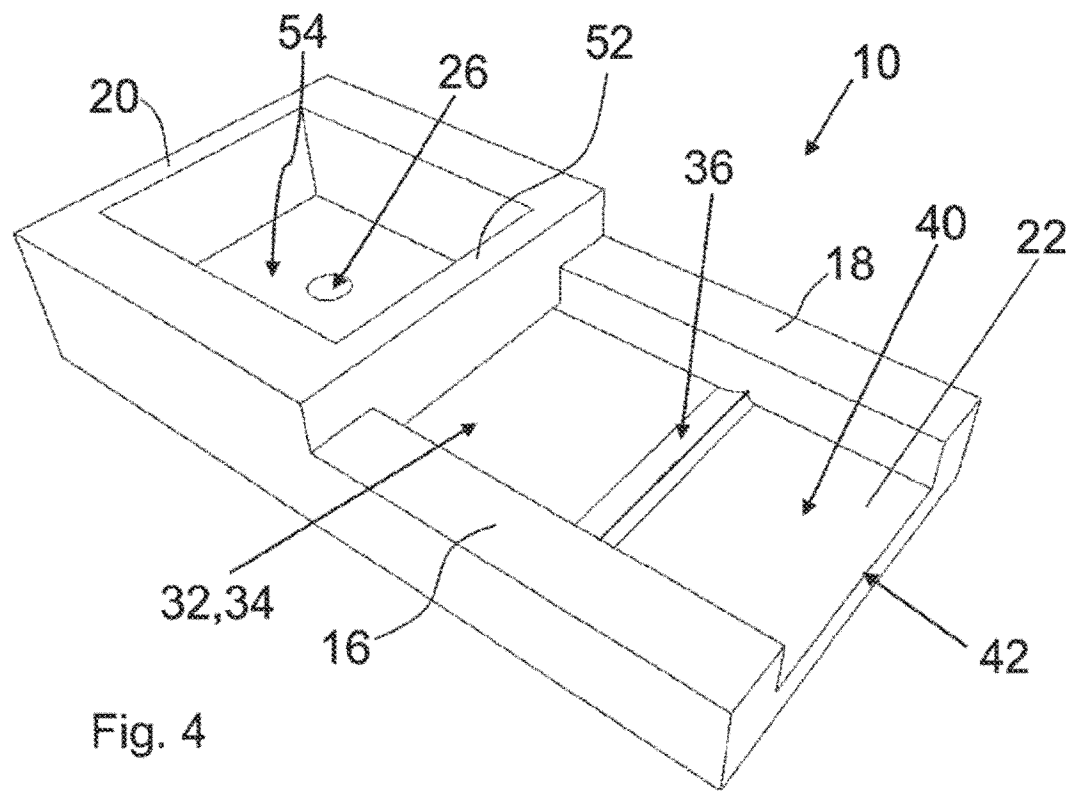
Figure 5:
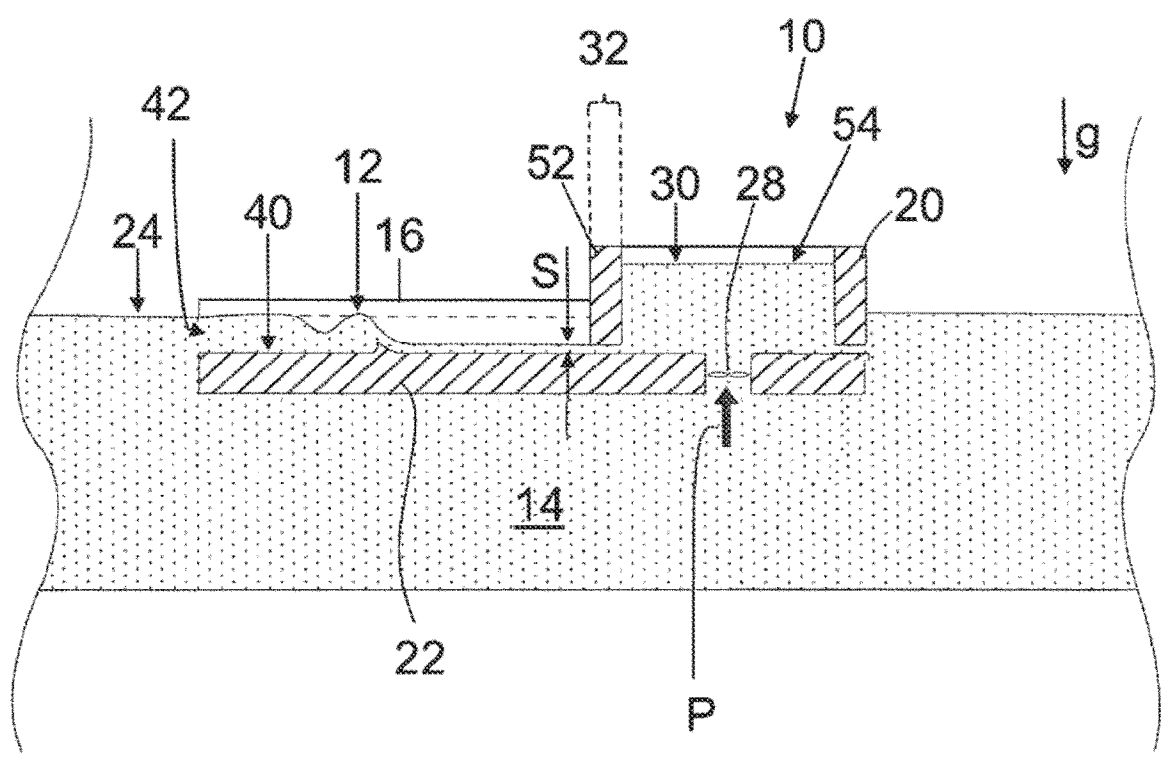
Figure 6:
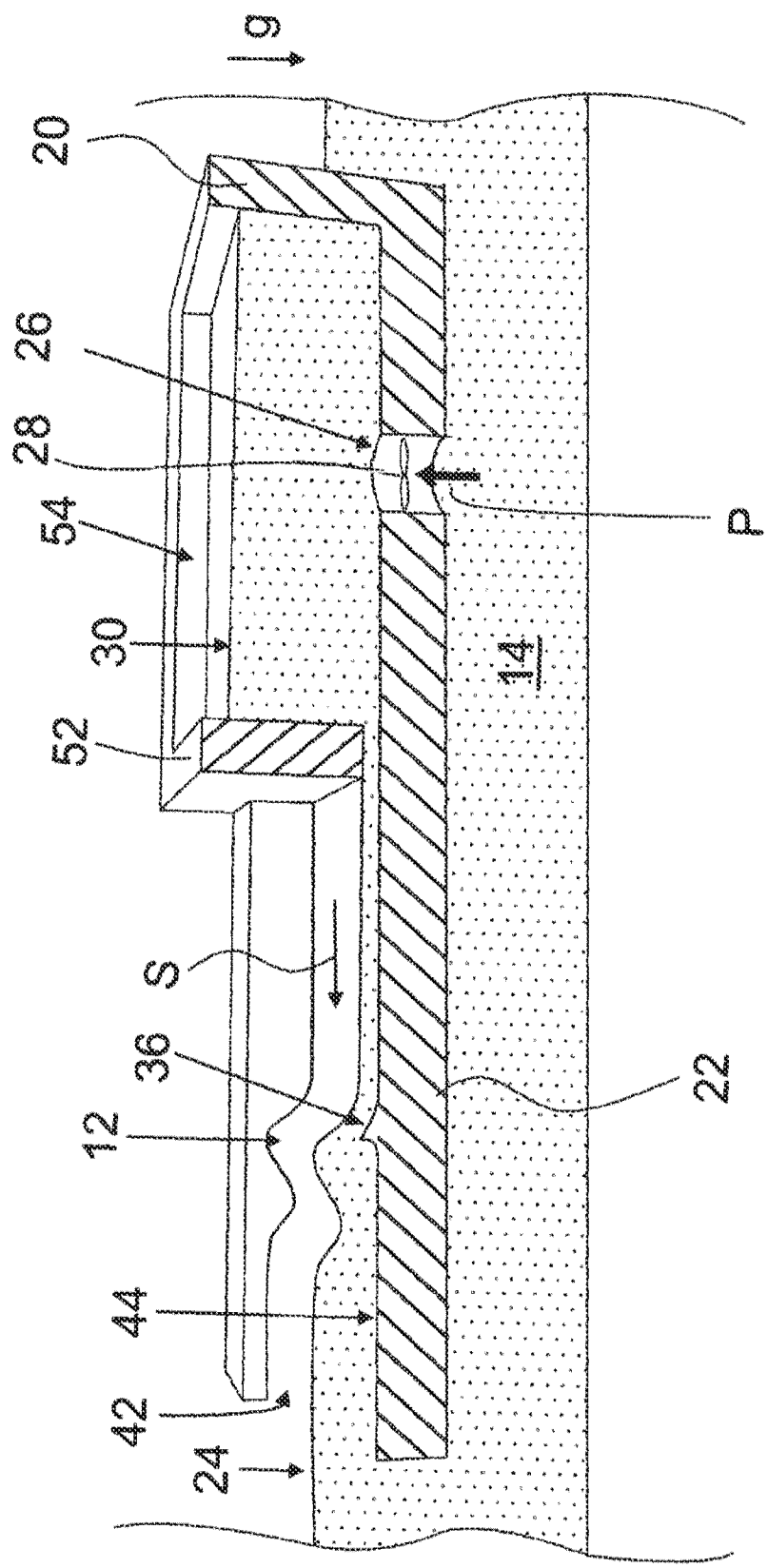
Figure 7:
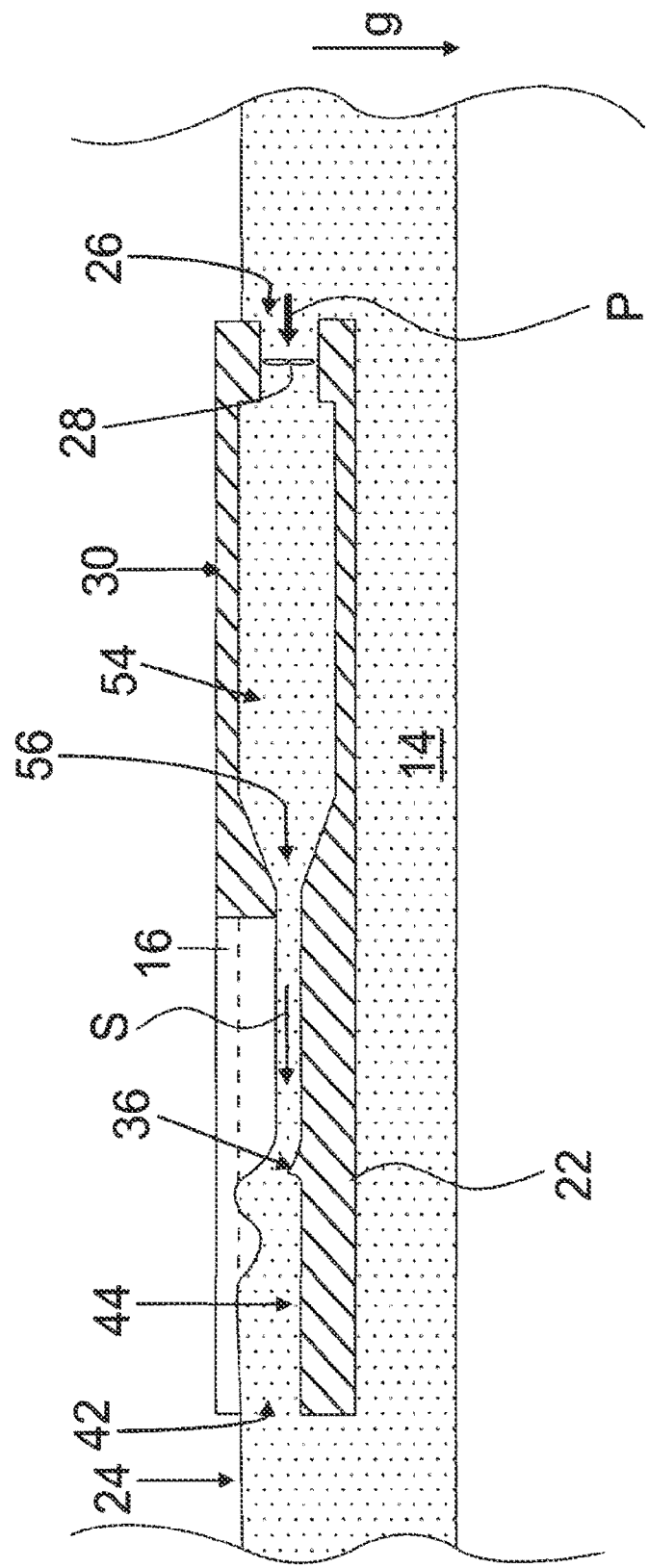
Figure 8:
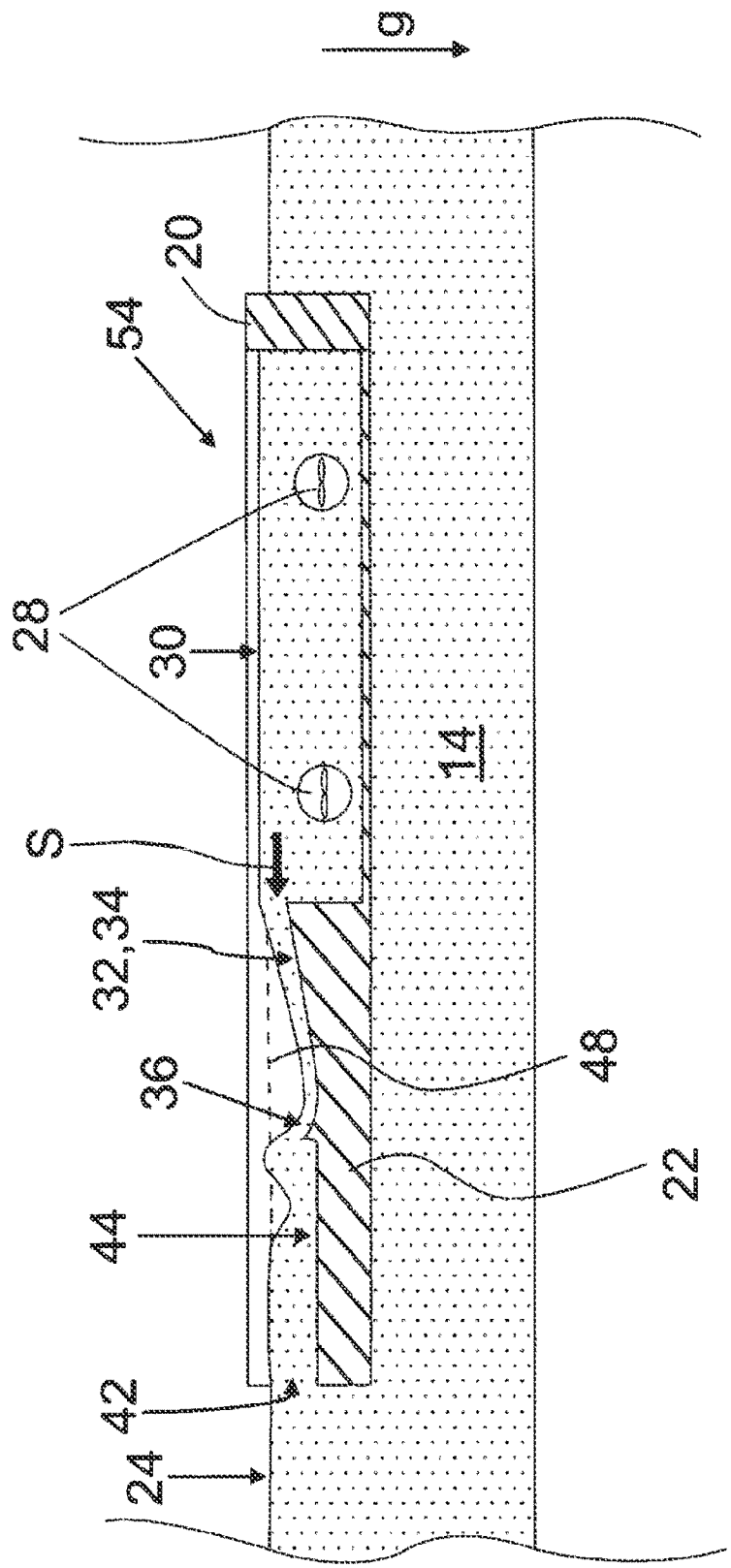
Figure 9:
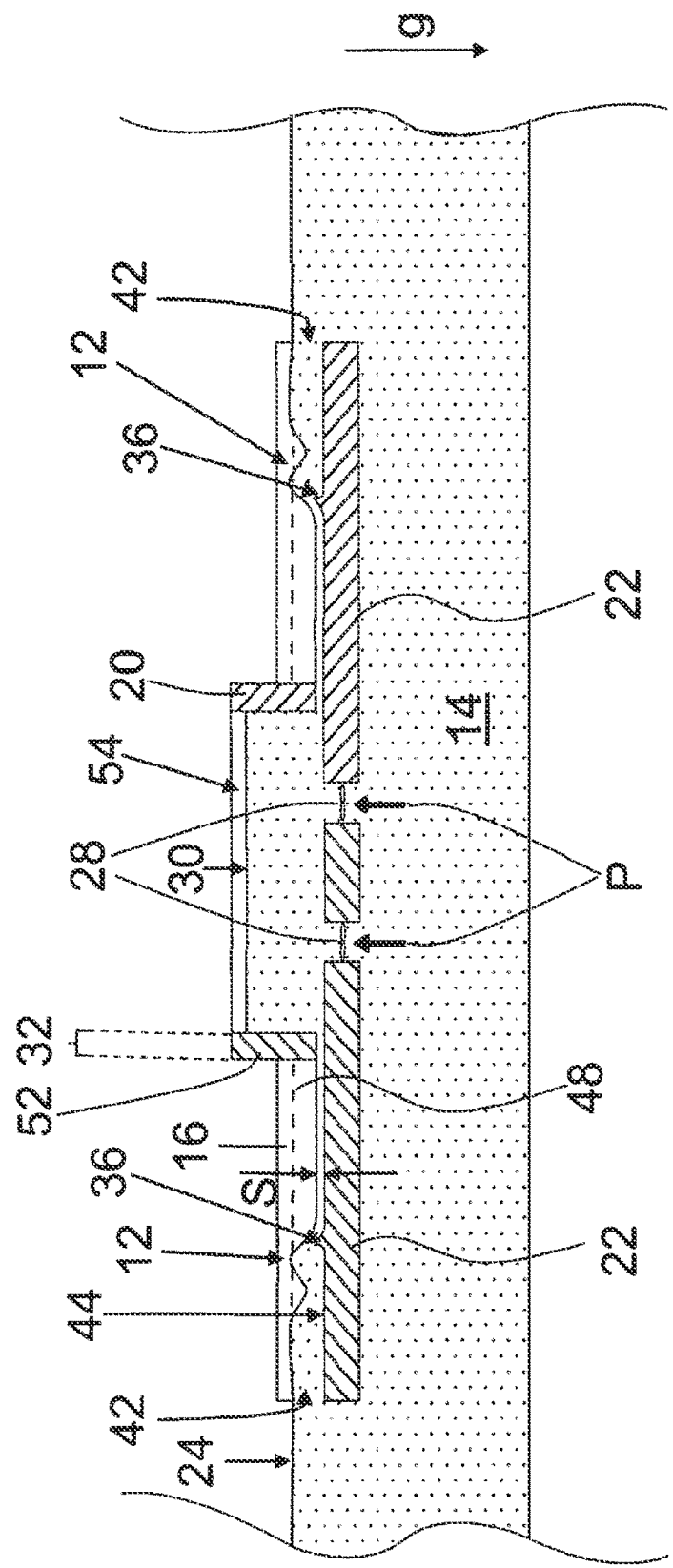
Figure 10:
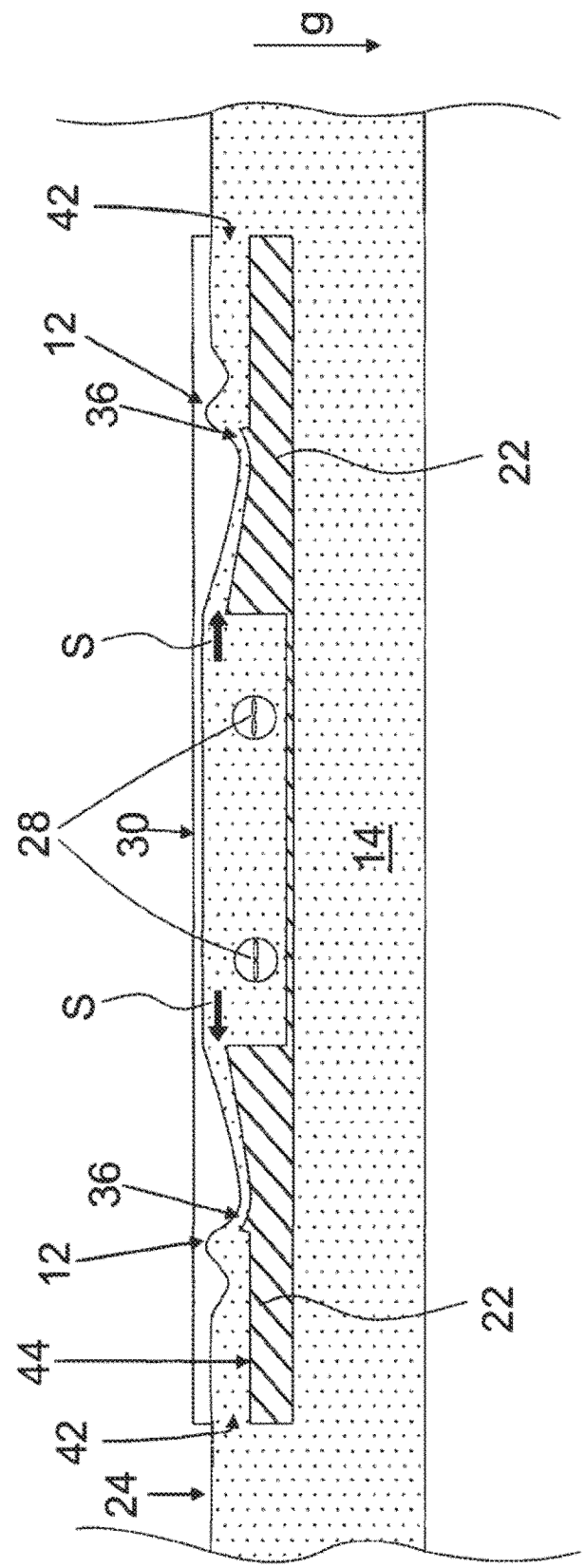
Figure 11:
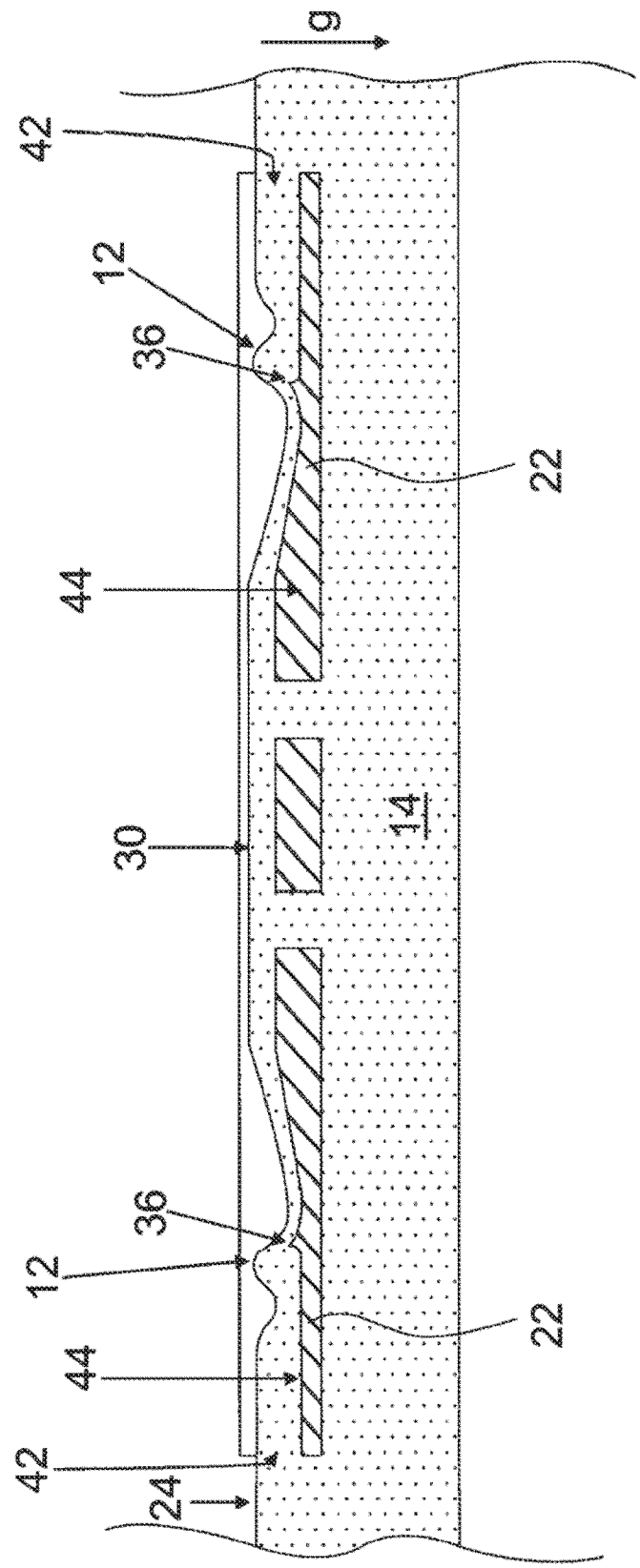
Figure 12:
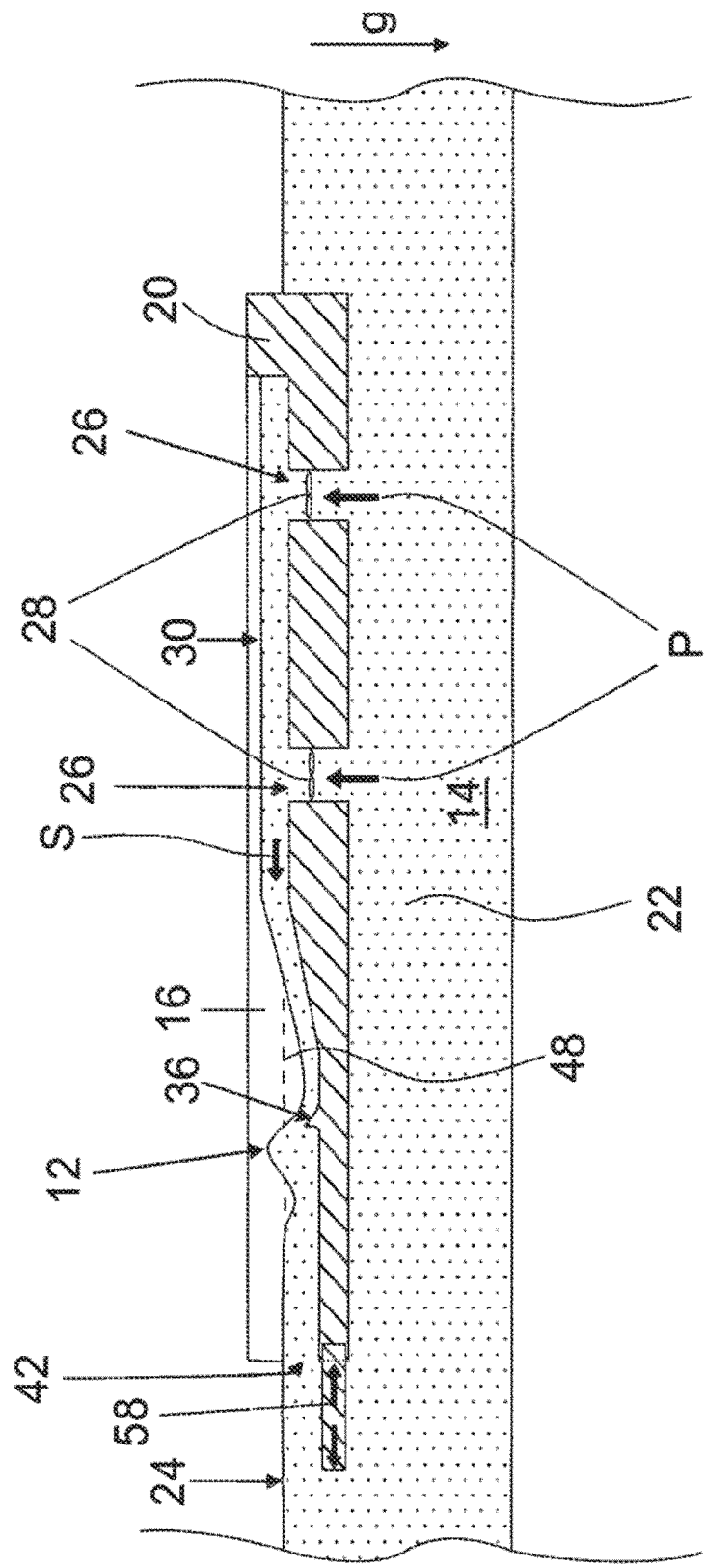
Figure 13:
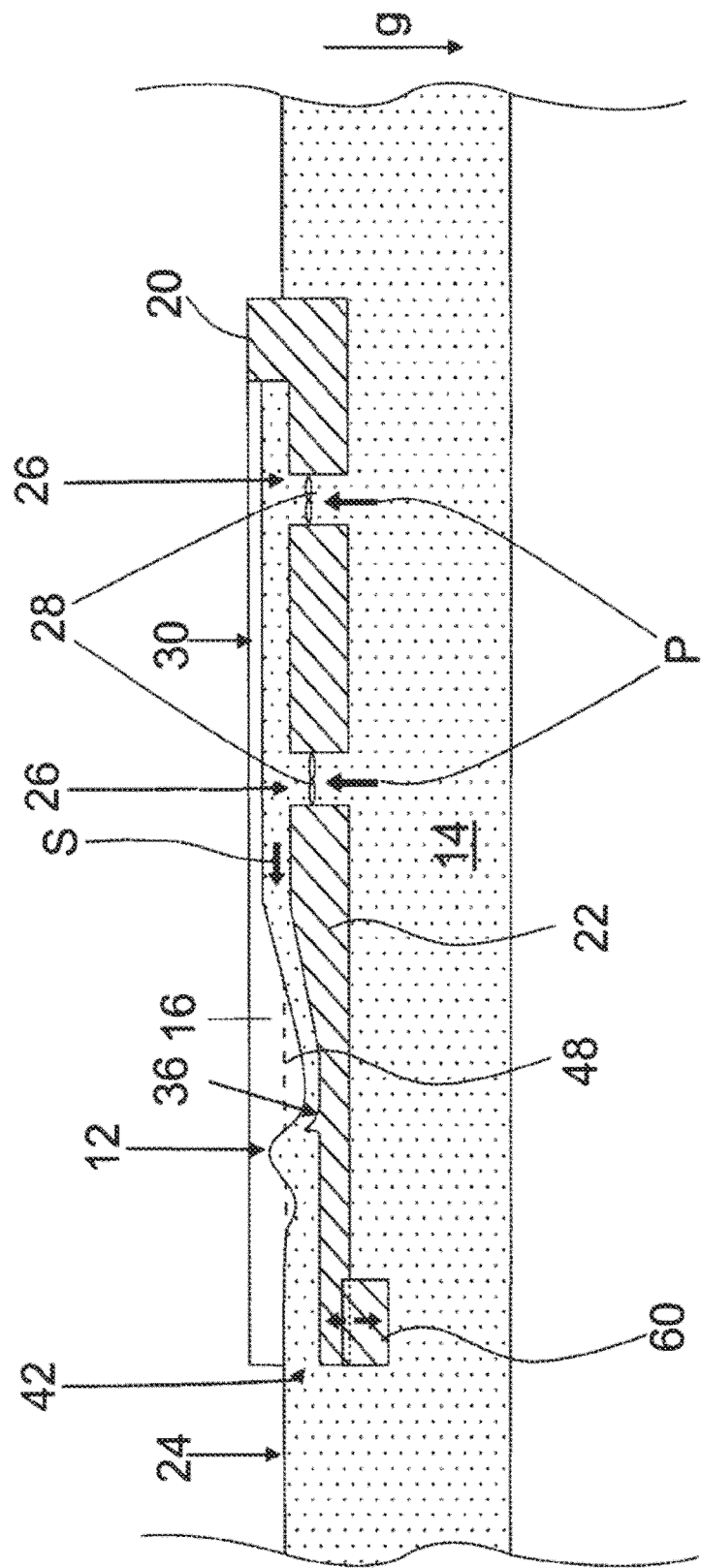
Figure 14:
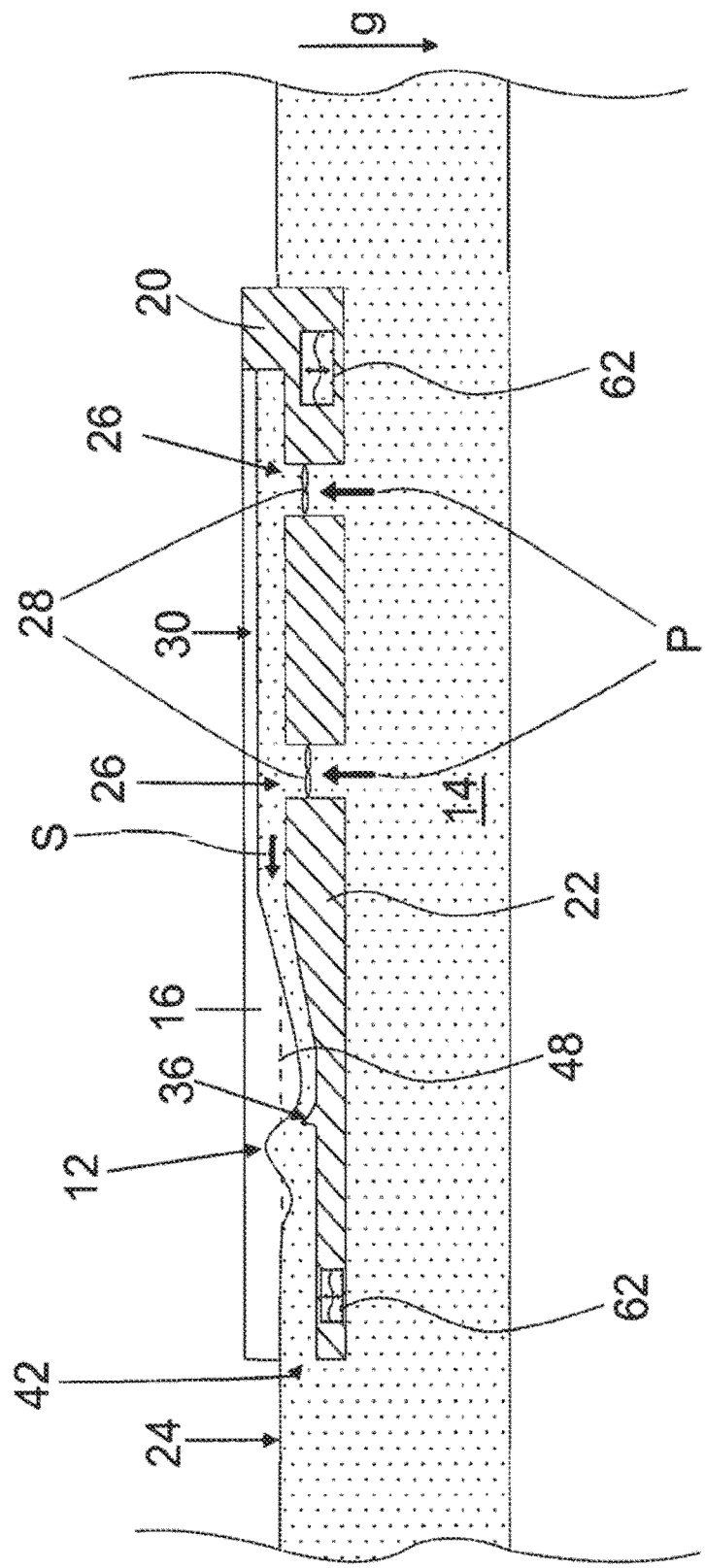
Figure 15:
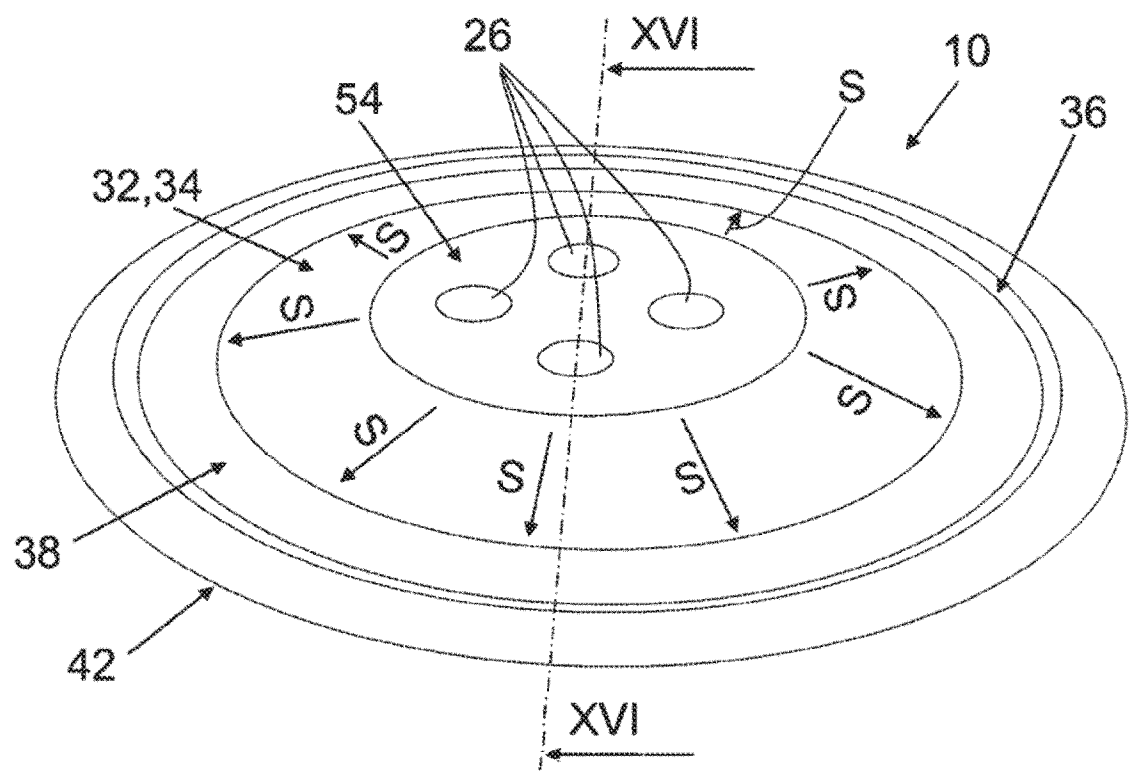
Figure 16:
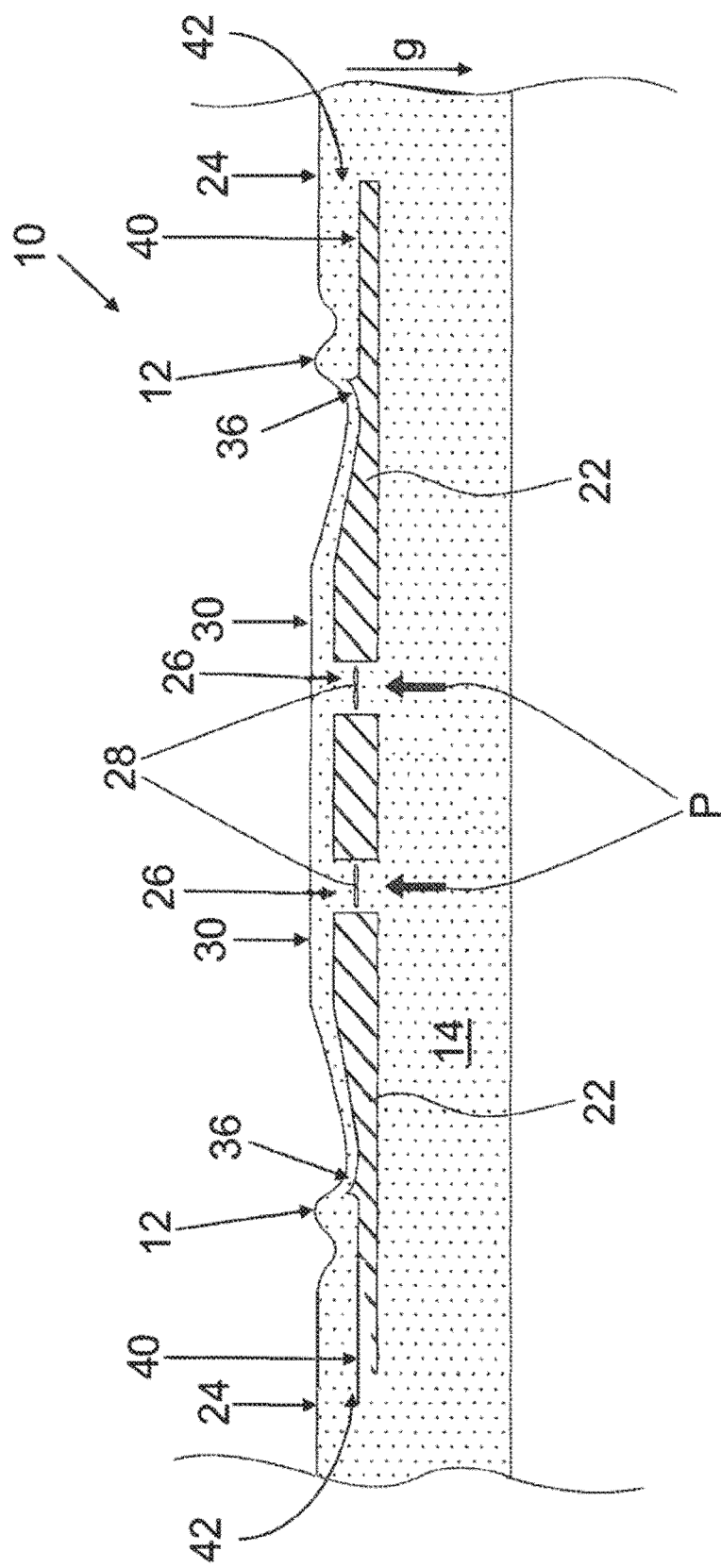

FIGS. 15 and 16 show another arrangement 50 according to the invention which differs from all the arrangements described above in that the apparatus 10 has a round (here circular) basic shape and water may flow out from a starting region 30 in any radial direction as shown with arrows S. Accordingly, no lateral limiting elements are provided in this apparatus 10. However, as for the rest, the apparatus in FIGS. 15 and 16 functionally in general corresponds to the above described apparatus 10 from FIGS. 1 to 14.

The water conveyed with the pumps 28 to the starting level 30 thus flows from the starting level 30 in each radial direction outwards via a water acceleration section 32 designed in the manner of a water slide downwards and then upwards via a ramp surface area 36. A floor element 22 with a top side surface area 54, which is horizontally aligned in the embodiment shown, adjoins the ramp surface area 36, which like the acceleration section 32 extends over the entire periphery, radially on the outside. The floor element 22 extends radially outwards to an outflow area 42 into the water basin 14 or standing water body. The floor element 22 also extends over the entire periphery of the apparatus 10.

An advantage of the apparatus shown in FIGS. 15 and 16 is that a surfer using the standing wave generated can move circularly around the apparatus 10, similar to a surfer on a (non-standing) wave transversely to the wave. With such an apparatus, surfing transversely to the wave can thus be trained particularly well and, above all, better than with natural, moving waves and also, in contrast to all known apparatus for generating an artificial standing wave, continuously over an extended period of time.

The features of the invention disclosed in the present specification, in the drawings, as well as in the claims may be essential both individually and in any combinations for the realization of the invention in its various embodiments. The invention is not limited to the described embodiments. It can be varied within the scope of the claims and taking into account the knowledge of the competent person skilled in the art.

REFERENCE LIST

10 Apparatus
12 Wave
14 Water basin
16 First side wall element
18 Second side wall element
20 Cross member
22 Floor element
24 Water level
26 Passage opening
28 Pump
30 Starting level
32 Water acceleration section
34 Flow-off surface
36 Ramp surface area
38 Intermediate area
40 Top side surface area
42 Outflow area
46 Wave generation section
48 Line
50 Arrangement
52 Cross wall
54 Water collecting basin 56 Outflow opening
58 Partial element
60 Partial element
62 Trimming tank

The invention claimed is:

1. A floating wave generating device for generating a standing wave in a standing water body or a water basin, the apparatus comprising:
   at least one water acceleration section;
   at least one wave generation section located downstream of the at least one water acceleration section; and
   at least one pump configured to convey water from an underwater area of the standing water body or the water basin to a starting level that is higher than a water level of the standing water body or the water basin to generate a water flow directed toward the at least one wave generation section by gravity;
   wherein the at least one wave generation section is configured to be at least partially submerged in the standing water body or water basin.

2. The floating wave generating device according to claim 1, wherein at least one of the at least one water acceleration section, the at least one wave generation section, or the at least one pump is configured to be a floating body.

3. The floating wave generating device according to claim 1, further comprising two side wall elements that each extend in a longitudinal direction and are arranged at a distance from each other; and
   at least one floor element extending at least over part of a length of each of the side wall elements transversely between the side wall elements,
   wherein the at least one water acceleration section and the at least one wave generation section are disposed between the two side wall elements.

4. The floating wave generating device according to claim 3, wherein the two side wall elements are connected to each other by an additional cross member to form a U-shaped structure.

5. The floating wave generating device according to claim 3, wherein the at least one floor element extends from a cross member over a full width between the two side wall elements and is guided in a longitudinal direction of the two side wall elements into a region downstream of the at least one water acceleration section.

6. The floating wave generating device of claim 5, wherein the generated water flow flows from the at least one water acceleration section to an outflow area open on one side into the standing water body or the water basin.

7. The floating wave generating device according to claim 3, wherein the at least one wave generation section includes a ramp surface area inclined upwards in the direction of the water flow and disposed downstream of the at least one water acceleration section, wherein an end portion of the floor element extends downstream of the ramp surface area.

8. The floating wave generating device according to claim 7, wherein the end portion of the floor element is configured to be transitionable from at least one of a first depth to a second depth in the standing water body or water basin, a first length of the end portion of the floor element and a second length of the end portion of the floor element, or from a first geometric configuration to a second geometric configuration.

9. The floating wave generating device according to claim 1, wherein the at least one wave generation section includes a ramp surface area inclined upwards in the direction of the water flow downstream of the at least one water acceleration section.

10. The floating wave generating device according to claim 9, wherein the ramp surface area is configured to generate a wave that breaks in a direction upstream of an upper edge of the ramp surface area.

11. A method for operating the floating wave generating device of claim 1, the method comprising conveying water with the at least one pump to establish a water film thickness of at least 15 cm in the at least one water acceleration section.

12. A method for operating the floating wave generating device of claim 1, the method comprising conveying water with the at least one pump to establish a water velocity of at least 4.5 m/s in the at least one water acceleration section.

13. The floating wave generating device according to claim 1, wherein the wave generation section is in fluid communication with the standing water body or the water basin such that the water flow flowing through the wave generation section impacts slower flowing water or stationary water of the standing water body or water basin to generate a standing wave.

14. The floating wave generating device according to claim 1, further comprising a water collecting basin upstream of the water acceleration section, wherein the pump is configured to convey the water from the underwater area of the standing water body or water basin into the water collecting basin.

15. A floating wave generating device for generating a standing wave in a standing water body or a water basin, the apparatus comprising:
   a water acceleration section;
   a wave generation section located downstream of the water acceleration section and at least partially submerged in the standing water body or water basin; and
   a pump, wherein the pump is configured to convey water from an underwater area of the standing water body or the water basin to a starting level that is higher than a water level of the standing water body or the water basin to generate a water flow directed toward the wave generation section and to an outflow area by gravity, the water flow configured to impact water of the standing water body or the water basin adjacent the outflow area to generate a wave; and a floor element extending from the wave generation section to the outflow area.

16. The floating wave generating device according to claim 15, further comprising a leveling device to control an immersion depth of the apparatus at least in the at least one wave generation section.

17. The floating wave generating device according to claim 16, further comprising a plurality of wave generation sections, wherein at least two lateral limiting elements are assigned to each wave generation section to laterally limit the at least one water acceleration section and the plurality of wave generation sections on two sides thereof with respect to the standing water body or the water basin.

18. The floating wave generating device of claim 15, wherein at least one of the water acceleration section, the wave generation section, the floor element, or the pump are configured to float in the standing water body or water basin.

* * * * *

UNITED STATES PATENT AND TRADEMARK OFFICE
CERTIFICATE OF CORRECTION

| | | |
|---|---|---|
| PATENT NO. | : 11,478,689 B2 | |
| APPLICATION NO. | : 16/603150 | |
| DATED | : October 25, 2022 | |
| INVENTOR(S) | : Johannes Degenhardt and Stefan Jandke | |

It is certified that error appears in the above-identified patent and that said Letters Patent is hereby corrected as shown below:

On the Title Page
On page 2, under ABSTRACT "18 Claims, 13 Drawing Sheets" should read "18 Claims, 14 Drawing Sheets" as shown on attached page.

In the Drawings
Please delete Drawing Sheets 1-13 and substitute therefore Drawing Sheets 1-14 as shown on attached pages.

Signed and Sealed this
Twenty-fifth Day of April, 2023

Katherine Kelly Vidal
*Director of the United States Patent and Trademark Office* basin with its water level is part of the wave generation section.

18 Claims, 14 Drawing Sheets

(51) Int. Cl.
*A63B 69/00* (2006.01)
*A63G 31/00* (2006.01)
*E04H 4/00* (2006.01)

(58) Field of Classification Search
USPC .................................................. 405/79; 4/491
See application file for complete search history.

(56) References Cited

U.S. PATENT DOCUMENTS

| | | |
|---|---|---|
| 6,019,547 A | 2/2000 | Hill |
| 2003/0180095 A1 | 9/2003 | McFarland |
| 2009/0285633 A1* | 11/2009 | Benham .............. A63B 69/125 |
| | | 405/79 |
| 2011/0099707 A1* | 5/2011 | Klimaschewski .... E04H 4/0006 |
| | | 4/491 |
| 2011/0116870 A1 | 5/2011 | Aufleger et al. |
| 2014/0000020 A1 | 1/2014 | von Groll et al. |
| 2016/0199744 A1* | 7/2016 | McCarthy .............. A63G 21/18 |
| | | 472/128 |
| 2017/0036124 A1* | 2/2017 | Parlane .................. E04H 4/0006 |

FOREIGN PATENT DOCUMENTS

| | | |
|---|---|---|
| DE | 102011120482 A1 | 6/2013 |
| EP | 0547117 A1 | 6/1993 |
| WO | 2004076779 A1 | 9/2004 |
| WO | WO 2009/064445 A1 * | 5/2009 |
| WO | 2018083264 A1 | 5/2018 |

OTHER PUBLICATIONS

German Office Action issued in corresponding German Application No. 10 2017 107 338.8 dated Nov. 24, 2017, 3 pages.
International Search Report and Written Report Documents issued in corresponding International Application No. PCT/IB2018/000531 dated Oct. 17, 2019, 26 pages.

* cited by examiner